(12) United States Patent
Schmitz et al.

(10) Patent No.: US 11,376,569 B2
(45) Date of Patent: Jul. 5, 2022

(54) FOUR-WAY CONVERSION CATALYST HAVING IMPROVED FILTER PROPERTIES

(71) Applicant: BASF Corporation, Florham Park, NJ (US)

(72) Inventors: Thomas Schmitz, Hannover (DE); Attilio Siani, Shanghai (CN); Stephan Siemund, Hannover (DE); Janosch Cravillon, Hannover (DE)

(73) Assignee: BASF Corporation, Florham Park, NJ (US)

( * ) Notice: Subject to any disclaimer, the term of this patent is extended or adjusted under 35 U.S.C. 154(b) by 135 days.

(21) Appl. No.: 16/966,319

(22) PCT Filed: Feb. 4, 2019

(86) PCT No.: PCT/EP2019/052636
§ 371 (c)(1),
(2) Date: Jul. 30, 2020

(87) PCT Pub. No.: WO2019/149930
PCT Pub. Date: Aug. 8, 2019

(65) Prior Publication Data
US 2020/0368727 A1    Nov. 26, 2020

(30) Foreign Application Priority Data
Feb. 5, 2018    (EP) .................... 18155096

(51) Int. Cl.
*B01J 35/00*    (2006.01)
*B01J 23/63*    (2006.01)
(Continued)

(52) U.S. Cl.
CPC ............ *B01J 23/63* (2013.01); *B01D 53/945* (2013.01); *B01J 23/58* (2013.01); *B01J 35/0006* (2013.01);
(Continued)

(58) Field of Classification Search
CPC .... B01J 23/63; B01J 35/0006; B01J 37/0244; B01J 37/0248; F01N 3/101; F01N 3/28;
(Continued)

(56) References Cited

U.S. PATENT DOCUMENTS 8,709,349 B2 *    4/2014    Miyairi .............. B01D 46/2429
                                                422/177
8,845,974 B2 *    9/2014    Li ....................... C04B 38/0006
                                                422/177
(Continued)

FOREIGN PATENT DOCUMENTS

CN    101605968 A    5/2012
CN    103079683 A    9/2015
(Continued)

OTHER PUBLICATIONS

International Search Report dated May 6, 2019 in PCT/EP2019/052636 filed on Feb. 4, 2019.

*Primary Examiner* — Tom P Duong
(74) *Attorney, Agent, or Firm* — Finnegan, Henderson, Farabow, Garrett & Dunner LLP

(57) ABSTRACT

A four-way conversion catalyst for treating a gasoline engine exhaust gas has a porous wall flow filter substrate with an inlet end, outlet end, substrate axial length extending between the inlet and outlet end, and passages defined by porous internal walls of the substrate, the passages having inlet passages with an open inlet and closed outlet, and outlet passages having a closed inlet and open outlet. The internal wall pores have a three-way conversion catalytic in-wall coating with an oxygen storage compound and a platinum group metal supported on a refractory metal oxide. On at least a portion of the internal wall surface defining the interface between the internal walls and the passages, the catalyst has a porous on-wall coating from the internal wall surface to the passage. The coating has porous oxidic (Continued)

compound and platinum group metal content of 0 to 0.001 wt. %, of the total coating weight.

18 Claims, 3 Drawing Sheets

(51) Int. Cl.
| | |
|---|---|
| *B01D 53/94* | (2006.01) |
| *B01J 23/58* | (2006.01) |
| *B01J 35/04* | (2006.01) |
| *B01J 35/10* | (2006.01) |
| *B01J 37/00* | (2006.01) |
| *B01J 37/02* | (2006.01) |
| *F01N 3/10* | (2006.01) |
| *F01N 3/28* | (2006.01) |

(52) U.S. Cl.
CPC ........... *B01J 35/04* (2013.01); *B01J 35/1014* (2013.01); *B01J 35/1019* (2013.01); *B01J 37/0063* (2013.01); *B01J 37/0228* (2013.01); *B01J 37/0244* (2013.01); *B01J 37/0248* (2013.01); *F01N 3/101* (2013.01); *F01N 3/28* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/20715* (2013.01); *B01D 2255/407* (2013.01); *B01D 2255/50* (2013.01); *B01D 2255/908* (2013.01); *B01D 2255/9155* (2013.01); *B01D 2255/9205* (2013.01); *B01D 2255/9207* (2013.01); *F01N 2370/02* (2013.01)

(58) Field of Classification Search
CPC ................ F01N 2370/02; F01N 3/035; B01D 2255/9155; Y02T 10/12
USPC ........................................................ 422/180
See application file for complete search history.

(56) References Cited

U.S. PATENT DOCUMENTS

| | | | |
|---|---|---|---|
| 2006/0057046 A1* | 3/2006 | Punke | B01J 37/0248 422/177 |
| 2007/0269352 A1* | 11/2007 | Miyairi | B01J 29/06 422/168 |
| 2008/0070776 A1* | 3/2008 | Yamaguchi | B01J 35/04 502/100 |
| 2010/0058746 A1 | 3/2010 | Pfeifer et al. | |
| 2010/0275579 A1 | 11/2010 | Klingmann et al. | |
| 2011/0212831 A1 | 9/2011 | Goto et al. | |
| 2012/0124974 A1 | 5/2012 | Li et al. | |
| 2012/0288427 A1* | 11/2012 | Grubert | F01N 13/009 427/230 |
| 2013/0243659 A1 | 9/2013 | Sutton et al. | |
| 2014/0161693 A1* | 6/2014 | Brown | B01D 53/944 60/297 |
| 2015/0321184 A1 | 11/2015 | Fedeyko et al. | |
| 2016/0310935 A1 | 10/2016 | Sutton et al. | |
| 2018/0163596 A1* | 6/2018 | Pun | B01D 53/9418 |
| 2018/0185788 A1* | 7/2018 | Grubert | B01J 37/082 |

FOREIGN PATENT DOCUMENTS

| | | |
|---|---|---|
| CN | 103282610 A | 9/2015 |
| WO | WO2011151711 A1 | 12/2011 |
| WO | WO2012071338 A2 | 5/2012 |
| WO | WO 2014/116897 A1 | 7/2014 |
| WO | WO2017209083 A1 | 12/2017 |

\* cited by examiner

FOUR-WAY CONVERSION CATALYST HAVING IMPROVED FILTER PROPERTIES

The present invention relates to four-way conversion catalyst for the treatment of an exhaust gas stream of a gasoline engine wherein said catalyst comprises a porous wall flow filter substrate comprising an in-wall coating and an on-wall coating. Further, the present invention relates to a process for the preparation of said catalyst. Yet further, the present invention relates an exhaust gas treatment system comprising said catalyst.

Four-way conversion (FWC) catalysts can be used in gasoline applications to filter particulate matter emitted by the respective engine in order to comply with future stringent emission particle number emission regulations (Euro6c). In current state-of-the-art FWC catalysts the catalytic washcoat is applied in the filters wall (full in-wall coating) in order to minimize the backpressure increase over the raw substrate. US 2012/124974 A1 discloses a catalyst which comprises a wall-flow substrate which in turn comprises a coating permeating the walls of the substrate and a coating which is disposed on the walls of the substrate. However, the only example of US 2012/124974 A1 describing a catalyst with the catalytic washcoat in the filter walls, as mentioned above, is the (comparative) example 1 showing a one-washcoat configuration. In order to achieve the desired particle filtration efficiency, the catalyst loading applied on the particulate filter is usually varied, in particular a higher catalyst loading is used to achieve a higher filtration efficiency. Furthermore, the desired filtration efficiency has to be achieved already in the fresh state of the filter, thus without any ash or soot which would accumulate on the filter during usage on the vehicle. However, higher catalyst loadings lead to increased back-pressure in the after-treatment system and leads to steeper back-pressure increase occurring during the FWC life-time in the vehicle. Such steep back-pressure increase needs to be avoided to vehicle power and fuel economy drawbacks.

Therefore, it was an object of the present invention to provide a four-way conversion catalyst exhibiting an improved particle filtration efficiency and, at the same time, no or only a moderate increase in back-pressure.

Surprisingly, it was found that a four-way catalyst which, in addition to the full in-wall coating, comprises a specific on-wall coating, represents a FWC catalyst which solves the problem underlying the invention, in particular is a FWC catalyst exhibiting an improved particle filtration efficiency and, at the same time, no or only a moderate increase in back-pressure.

Therefore, the present invention relates to a four-way conversion catalyst for the treatment of an exhaust gas stream of a gasoline engine, the catalyst comprising a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
wherein the pores of the porous internal walls comprise a three-way conversion catalytic in-wall coating which comprises an oxygen storage compound and a platinum group metal supported on a refractory metal oxide;
wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound and has a platinum group metal content in the range of from 0 to 0.001 weight-%, based on the total weight of the on-wall coating.

In the context of the present invention, the term "the surface of the porous internal walls" is to be understood as the "naked" or "bare" or "blank" surface of the walls, i.e. the surface of the walls in an untreated state which consists—apart from any unavoidable impurities with which the surface may be contaminated—of the material of the walls.

The feature "the on-wall coating has a platinum group metal content in the range of from 0 to x weight-%, based on the total weight of the on-wall coating" as used herein is to be understood as the total content encompassing all platinum group metals.

In particular, the four-way conversion catalyst of the present invention is a fresh catalyst, i.e. a catalyst which had not been exposed to a treatment of an exhaust gas stream of a gasoline engine.

Preferably, the platinum group metal content of the on-wall coating is in the range of from 0 to 0.0001 weight-%, more preferably in the range of from 0 to 0.00001 weight-%. More preferably, the platinum group metal content is 0 weight-% which is to be understood as a platinum group metal content wherein every platinum group metal possibly present in the on-wall coating is present in the on-wall coating below its respective limit of detection.

Preferably, the platinum group metal which is possibly comprised in the on-wall coating at the above-described very low amounts or which is not contained in the on-wall coating is one or more of ruthenium, palladium, rhodium, platinum, and iridium.

Generally, there are no specific restrictions regarding the porous oxidic compound which is comprised in the on-wall coating. Preferably, the porous oxidic compound comprises one or more of an oxygen storage compounds and a refractory metal oxide. Therefore, the porous oxidic compound may comprise one or more porous oxidic compounds which serve as oxygen storage compounds of the four-way conversion catalyst, or may comprise one or more refractory metal oxides, or may comprise both one or more porous oxidic compounds which serve as oxygen storage compounds of the four-way conversion catalyst and one or more refractory metal oxides.

Preferably, the oxygen storage compound comprised in the on-wall coating comprises cerium, more preferably comprises one or more of a cerium oxide, a mixture of oxides comprising a cerium oxide, and a mixed oxide comprising cerium. If the oxygen storage compound comprises a mixed oxide of cerium, the mixed oxide comprising cerium preferably additionally comprises one or more of zirconium and praseodymium. More preferably, the oxygen storage compound comprised in the on-wall coating comprises one or more of a cerium oxide, a mixture of a cerium oxide and a zirconium oxide, and a mixed oxide of cerium and zirconium. More preferably, the oxygen storage compound comprised in the on-wall coating comprises a mixed oxide of cerium and zirconium.

Therefore, the present invention preferably relates to a four-way conversion catalyst for the treatment of an exhaust gas stream of a gasoline engine, the catalyst comprising a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;

wherein the pores of the porous internal walls comprise a three-way conversion catalytic in-wall coating which comprises an oxygen storage compound and a platinum group metal supported on a refractory metal oxide;

wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound which comprises an oxygen-storage compound and has a platinum group metal content in the range of from 0 to 0.001 weight-%, based on the total weight of the on-wall coating, wherein the oxygen storage compound preferably comprises cerium, more preferably a mixed oxide comprising cerium, more preferably a mixed oxide of cerium and zirconium.

Preferably, the mixed oxide of cerium and zirconium has a cerium content, calculated as cerium oxide ($CeO_2$), in the range of from 10 to 80 weight-%, more preferably in the range of from 20 to 60 weight-%, based on the total weight of the mixed oxide of cerium and zirconium. Preferably, the mixed oxide of cerium and zirconium has a zirconium content, calculated as zirconia ($ZrO_2$), in the range of from 90 to 10 weight-%, more preferably in the range of from 70 to 20 weight-%, based on the total weight of the mixed oxide of cerium and zirconium. Preferably, the oxygen storage compound comprised in the on-wall coating has a porosity in the range of from 0.1 to 1.2 ml/g, more preferably in the range of from 0.2 to 0.8 ml/g, more preferably in the range of from 0.3 to 0.6 ml/g, as determined according to Reference Example 1 herein. Preferably, the oxygen storage compound comprised in the on-wall coating has a BET specific surface area in the range of from 15 to 150 $m^2/g$, more preferably in the range of from 30 to 100 $m^2/g$, more preferably in the range of from 50 to 80 $m^2/g$, as determined according to Reference Example 2 herein.

Preferably, the refractory metal oxide comprised in the on-wall coating comprises one or more of alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, more preferably one or more of alumina, zirconia-alumina, silica-alumina, lanthana, lanthana-alumina, silica-zirconia-lanthana, alumina doped with manganese, alumina-zirconia-lanthana, titania, zirconia-titania, neodymia, and praseodymia. More preferably, the refractory metal oxide comprised in the on-wall coating comprises one or more of an aluminum oxide, a mixture of oxides comprising an aluminum oxide, and a mixed oxide comprising aluminum. If the on-wall coating comprises a mixed oxide comprising aluminum, the mixed oxide preferably additionally comprises one or more of zirconium, cerium, lanthanum, barium, and neodymium. More preferably, the refractory metal oxide comprised in the on-wall coating comprises an aluminum oxide.

Therefore, the present invention preferably relates to a four-way conversion catalyst for the treatment of an exhaust gas stream of a gasoline engine, the catalyst comprising a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;

wherein the pores of the porous internal walls comprise a three-way conversion catalytic in-wall coating which comprises an oxygen storage compound and a platinum group metal supported on a refractory metal oxide;

wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound which comprises a refractory metal oxide and has a platinum group metal content in the range of from 0 to 0.001 weight-%, based on the total weight of the on-wall coating, wherein the refractory metal oxide preferably comprises an aluminum oxide.

Preferably, the aluminum oxide comprised in the on-wall coating has a porosity in the range of from 0.2 to 1.5 ml/g, more preferably in the range of from 0.5 to 1.2 ml/g, more preferably in the range of from 0.7 to 1 ml/g, as determined according to Reference Example 1 herein. Preferably, the aluminum oxide comprised in the on-wall coating has a BET specific surface area in the range of from 30 to 250 $m^2/g$, preferably in the range of from 50 to 200 $m^2/g$, more preferably in the range of from 90 to 160 $m^2/g$, as determined according to Reference Example 2 herein. Preferably, from 90 to 100 weight-%, more preferably from 95 to 100 weight-%, more preferably from 99 to 100 weight-% of the aluminum oxide comprised in the on-wall coating consist of gamma-aluminum oxide.

Therefore, the present invention preferably relates to a four-way conversion catalyst for the treatment of an exhaust gas stream of a gasoline engine, the catalyst comprising a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;

wherein the pores of the porous internal walls comprise a three-way conversion catalytic in-wall coating which comprises an oxygen storage compound and a platinum group metal supported on a refractory metal oxide;

wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound which comprises an oxygen-storage compound and a refractory metal oxide and has a platinum group metal content in the range of from 0 to 0.001 weight-%, based on the total weight of the on-wall coating, wherein the oxygen storage compound preferably comprises cerium, more preferably a mixed oxide comprising cerium, more preferably a mixed oxide of cerium and zirconium, and wherein the refractory metal oxide preferably comprises an aluminum oxide, more preferably a gamma-aluminum oxide.

Generally, it is conceivable that the on-wall coating essentially consists of the porous oxidic compound. Therefore, it is preferred that from 95 to 100 weight-%, more preferably from 99 to 100 weight-%, more preferably from 99.9 to 100 weight-% of the the on-wall coating consist of the porous oxidic compound. Therefore, it is preferred that from 95 to 100 weight-%, more preferably from 99 to 100 weight-%, more preferably from 99.9 to 100 weight-% of the the on-wall coating consist of the mixed oxide comprising cerium and the aluminum oxide, more preferably of the mixed oxide comprising cerium and zirconium and the gamma-aluminum oxide.

Preferably, the on-wall coating further comprises a promotor. The term "promotor" as used in this context of the present invention relates to a compound which promotes the overall catalytic activity. Preferably, the promotor comprises, more preferably is, one or more of a promotor comprising zirconium, preferably a zirconium oxide, a promotor comprising barium, preferably a barium oxide, a promotor comprising strontium, preferably a strontium oxide, a promotor comprising lanthanum, preferably a lanthanum oxide, a promotor comprising neodymium, preferably a neodymium oxide, a promotor comprising yttrium, preferably an yttrium oxide, a promotor comprising praseodymium, preferably a praseodymium oxide. More preferably, the promotor comprises, more preferably is, one or more of a promotor comprising zirconium and a promotor comprising barium. More preferably, the promotor comprised in the on-wall coating consists of a promotor comprising zirconium, preferably a zirconium oxide, and a promotor comprising barium, preferably a barium oxide.

Therefore, the present invention preferably relates to a four-way conversion catalyst for the treatment of an exhaust gas stream of a gasoline engine, the catalyst comprising
a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
wherein the pores of the porous internal walls comprise a three-way conversion catalytic in-wall coating which comprises an oxygen storage compound and a platinum group metal supported on a refractory metal oxide;
wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound which comprises an oxygen-storage compound and a refractory metal oxide and has a platinum group metal content in the range of from 0 to 0.001 weight-%, based on the total weight of the on-wall coating, wherein the oxygen storage compound preferably comprises cerium, more preferably a mixed oxide comprising cerium, more preferably a mixed oxide of cerium and zirconium, and wherein the refractory metal oxide preferably comprises an aluminum oxide, more preferably a gamma-aluminum oxide, and wherein the on-wall coating further comprises a promotor which preferably comprises zirconium oxide and barium oxide.

Preferably, the four-way conversion catalyst of embodiment 12 or 13, wherein in the on-wall coating, the weight ratio of the porous oxidic compound relative to the promotor is in the range of from 20:1 to 0.2:1, preferably in the range of from 15:1 to 1:1, more preferably in the range of from 12:1 to 5:1. Preferred ranges are, for example, from 12:1 to 10:1 or from 11:1 to 9:1 of from 10:1 to 8:1 or from 9:1 to 7:1 of from 8:1 to 6:1 or from 7:1 to 5:1.

It is preferred that the on-wall coating essentially consists of the porous oxidic compound and the promotor. Therefore, it is preferred that from 95 to 100 weight-%, more preferably from 99 to 100 weight-%, more preferably from 99.9 to 100 weight-% of the on-wall coating consist of the porous oxidic compound and the promotor. Therefore, it is preferred that from 95 to 100 weight %, more preferably from 99 to 100 weight-%, more preferably from 99.9 to 100 weight-% of the the on-wall coating consist of the mixed oxide comprising cerium and the aluminum oxide and the promotor comprising zirconium and barium, more preferably of the mixed oxide comprising cerium and zirconium and the gamma-aluminum oxide and the promotor comprising barium oxide and zirconium oxide.

According to the present invention, it is possible that the on-wall coating further comprises a zeolitic compound. Said zeolitic compound preferably has a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably having a framework structure type BEA, MFI, CHA, AEI, and/or FAU. It is also possible that the on-wall coating comprises two or more zeolitic compounds, preferably having identical or different framework structure type as described above. In this case, it is preferred that from 95 to 100 weight-%, more preferably from 99 to 100 weight-%, more preferably from 99.9 to 100 weight-% of the the on-wall coating consist of the porous oxidic compound, the zeolitic compound and optionally the promotor described hereinabove.

Preferably, the on-wall coating comprising a porous oxidic compound comprises, preferably consists of, an inlet on-wall coating comprising a porous oxidic compound, or an outlet on-wall coating comprising a porous oxidic compound, or an inlet on-wall coating comprising a porous oxidic compound and an outlet on-wall coating comprising porous oxidic compound. Generally, it is possible that in case the on-wall coating comprises an inlet on-wall coating and an outlet on-wall coating, the inlet on-wall coating is different from the outlet on-wall coating in one or more features described above. Preferably, the internal walls defining the inlet passages comprise the inlet on-wall coating comprising a porous oxidic compound, wherein the inlet on-wall coating length is x % of the substrate axial length wherein $0 \leq x \leq 100$; and the internal walls defining the outlet passages comprise the outlet on-wall coating comprising a porous oxidic compound, wherein the outlet on-wall coating length is y % of the substrate axial length wherein $0 \leq y \leq 100$; wherein x+y>0.

According to a first preferred embodiment, the on-wall coating comprises an inlet on-wall coating. In this case, it is preferred that $0<x \leq 100$, more preferably $50 \leq x \leq 100$, more preferably $75 \leq x \leq 100$, more preferably $90 \leq x \leq 100$, more preferably $95 \leq x \leq 100$, more preferably $98 \leq x \leq 100$, more preferably $99 \leq x \leq 100$. According to this embodiment, it is preferred that, with regard to the outlet on-wall coating, $0 \leq y \leq 5$, more preferably y=0. Thus, it is preferred that the on-wall coating consists of the inlet on-wall coating.

According to a second preferred embodiment, the on-wall coating comprises an outlet on-wall coating. In this case, it is preferred that $0<y \leq 100$, more preferably $50 \leq y \leq 100$, more preferably $75 \leq y \leq 100$, more preferably $90 \leq y \leq 100$, more preferably $95 \leq y \leq 100$, more preferably $98 \leq y \leq 100$, more preferably $99 \leq y \leq 100$. According to this embodiment, it is preferred that, with regard to the inlet on-wall coating, $0 \leq x \leq 5$, more preferably x=0. Thus, it is preferred that the on-wall coating consists of the outlet on-wall coating.

Further, it is conceivable that the on-wall coating comprises an inlet on-wall coating and an outlet on-wall coating. In this case, it may be preferred that $0<y \leq 100$, preferably $50 \leq y \leq 100$, more preferably $75 \leq y \leq 100$, more preferably $90 \leq y \leq 100$, more preferably $95 \leq y \leq 100$, more preferably $98 \leq y \leq 100$, more preferably $99 \leq y \leq 100$, and that $0 \leq x \leq 100$, preferably $50 \leq x \leq 100$, more preferably $75 \leq x \leq 100$, more preferably $90 \leq x \leq 100$, more preferably $95 \leq x \leq 100$, more preferably $98 \leq x \leq 100$, more preferably $99 \leq x \leq 100$.

Preferably, the four-way conversion catalyst of comprises the on-wall coating at a loading in the range of from 0.01 to 1.5 $g/in^3$, more preferably in the range of from 0.02 to 1.0 $g/in^3$, more preferably in the range of from 0.05 to 0.5 $g/in^3$. Preferred ranges are, for example, from 0.05 to 0.15 $g/in^3$ or from 0.1 to 0.2 $g/in^3$ or from 0.15 to 0.25 $g/in^3$ or from 0.2 to 0.3 $g/in^3$ or from 0.25 to 0.35 $g/in^3$ or from 0.3 to 0.4 $g/in^3$ or from 0.35 to 0.45 $g/in^3$ or from 0.4 to 0.5 $g/in^3$.

Preferably, as mentioned below, the porous internal walls of the porous wall-flow substrate which does not comprise the in-wall coating, i.e. the porous internal walls of the porous wall-flow substrate in their un-coated state, have an average porosity in the range of from 20 to 75%, more preferably in the range of from 30 to 70%, more preferably in the range of from 40 to 65%, as determined according to Reference Example 3 herein. Preferred ranges are, for example, from 40 to 50% or from 45 to 55% or from 50 to 60% or from 55 to 65%. It is preferred that the porous internal walls of the porous wall-flow substrate comprising the three-way conversion catalytic in-wall coating have an average porosity which is in the range of from 80 to 99%, preferably from 85 to 95% of the porosity of the porous internal walls of the porous wall-flow substrate which does not comprise the in-wall coating.

Preferably, as mentioned below, the pores of the porous internal walls of the porous wall-flow substrate which does not comprise the in-wall coating, i.e. the pores of the porous internal walls of the porous wall-flow substrate in their un-coated state, have an average pore size of less than 30 micrometer, preferably in the range of from 6 to 28 micrometer, more preferably in the range of from 8 to 25 micrometer, more preferably in the range of from 10 to 23 micrometer. It is preferred that the pores of the porous internal walls of the porous wall-flow substrate comprising the three-way conversion catalytic in-wall coating have an average pore size which is in the range of from 80 to 99%, preferably from 85 to 95% of the pore size of the porous internal walls of the porous wall-flow substrate which does not comprise the in-wall coating.

With regard to the material of the wall-flow substrate, no specific restrictions exist, provided the material is suitable for the intended use of the catalyst. Preferred materials include, but are not limited to, cordierite, cordierite-alpha alumina, silicon nitride, zircon mullite, spodumene, alumina-silica magnesia, zircon silicate, sillimanite, magnesium silicate, zircon, petalite, alpha alumina, silicon carbide, aluminum titanate, heat resistant metal, heat resistant metal alloys such as stainless steel. Preferably, the wall-flow substrate comprises, preferably consists of a cordierite, a silicon carbide, or an aluminum titanate.

With regard to the three-way conversion catalytic in-wall coating, the catalyst of the present invention is not subject to specific restrictions provided that the respective catalyst is suitable as a four-way conversion catalyst.

Preferably, the four-way conversion catalyst comprises the three-way conversion catalytic in-wall coating at a loading in the range of from 0.1 to 5 $g/in^3$, preferably in the range of from 0.2 to 4 $g/in^3$, more preferably in the range of from 0.3 to 3.0 $g/in^3$. Preferred ranges are, for example, from 0.3 to 1.0 $g/in^3$ or from 0.5 to 1.5 $g/in^3$ or from 1.0 to 2.0 $g/in^3$ or from 1.5 to 2.5 $g/in^3$ or from 2.0 to 3.0 $g/in^3$.

Preferably, the three-way conversion catalytic in-wall coating comprises a hydrocarbon (HC) oxidation component, a carbon monoxide (CO) oxidation component, and a nitrogen oxide (NOx) reduction component.

Preferably, the three-way conversion catalytic in-wall coating comprises one or more platinum group metals, preferably one or more of ruthenium, palladium, rhodium, platinum, and iridium, more preferably one or more of palladium, rhodium, and platinum, more preferably one or more of palladium and rhodium, more preferably palladium and rhodium.

The four-way conversion catalyst of any one of embodiments 1 to 28, comprising wherein the in-wall coating comprises the one or more platinum group metals at a total platinum group metal loading in the range of from 1 to 200 $g/ft^3$, preferably in the range of from 3 to 180 $g/ft^3$, more preferably in the range of from 4 to 150 $g/ft^3$.

Preferably, the oxygen storage compound comprised in the in-wall coating comprises cerium, more preferably comprises one or more of a cerium oxide, a mixture of oxides comprising a cerium oxide, and a mixed oxide comprising cerium. If the oxygen storage compound comprises a mixed oxide of cerium, the mixed oxide comprising cerium preferably additionally comprises one or more of zirconium and praseodymium. More preferably, the oxygen storage compound comprised in the in-wall coating comprises one or more of a cerium oxide, a mixture of a cerium oxide and a zirconium oxide, and a mixed oxide of cerium and zirconium. More preferably, the oxygen storage compound comprised in the in-wall coating comprises a mixed oxide of cerium and zirconium.

Preferably, the mixed oxide of cerium and zirconium has a cerium content, calculated as cerium oxide ($CeO_2$), in the range of from 10 to 80 weight-%, more preferably in the range of from 20 to 60 weight-%, based on the total weight of the mixed oxide of cerium and zirconium. Preferably, the mixed oxide of cerium and zirconium has a zirconium content, calculated as zirconia ($ZrO_2$), in the range of from 90 to 10 weight-%, more preferably in the range of from 70 to 20 weight-%, based on the total weight of the mixed oxide of cerium and zirconium. Preferably, the oxygen storage compound comprised in the in-wall coating has a porosity in the range of from 0.1 to 1.2 ml/g, more preferably in the range of from 0.2 to 0.8 ml/g, more preferably in the range of from 0.3 to 0.6 ml/g, as determined according to Reference Example 1 herein. Preferably, the oxygen storage compound comprised in the in-wall coating has a BET specific surface area in the range of from 15 to 150 m$^2$/g, more preferably in the range of from 30 to 100 m$^2$/g, more preferably in the range of from 50 to 80 m$^2$/g, as determined according to Reference Example 2 herein.

Preferably, the oxygen storage compound comprised in the in-wall coating comprises a platinum group metal supported thereon. Preferably, said platinum group metal is one or more of ruthenium, palladium, rhodium, platinum, and iridium, more preferably one or more of palladium, rhodium, and platinum, more preferably one or more of palladium and rhodium, more preferably one or more of palladium and rhodium, more preferably palladium. Preferably, the in-wall coating comprises the one or more platinum group metals supported on the oxygen storage component at a total loading in the range from 1 to 200 g/ft$^3$, preferably in the range of from 3 to 180 g/ft$^3$, more preferably in the range of from 4 to 150 g/ft$^3$. Preferably, the in-wall coating comprises the oxygen storage component at a loading in the range of from 0.1 to 3 g/in$^3$, preferably in the range of from 0.15 to 2.5 g/in$^3$, more preferably in the range of from 0.2 to 2 g/in$^3$.

Therefore, it is preferred that the in-wall coating comprises an oxygen storage compound preferably comprising a mixed oxide of cerium and zirconium, and a platinum group metal, preferably palladium, supported on said oxygen storage compound.

Preferably, the three-way conversion catalytic in-wall coating comprises a refractory metal oxide support. Preferably, the refractory metal oxide support comprised in the in-wall coating comprises one or more of alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, more preferably one or more of alumina, zirconia-alumina, silica-alumina, lanthana, lanthana-alumina, silica-zirconia-lanthana, alumina doped with manganese, alumina-zirconia-lanthana, titania, zirconia-titania, neodymia, and praseodymia. More preferably, the refractory metal oxide support comprised in the in-wall coating comprises one or more of an aluminum oxide, a mixture of oxides comprising an aluminum oxide, and a mixed oxide comprising aluminum. If the in-wall coating comprises a mixed oxide comprising aluminum, the mixed oxide preferably additionally comprises one or more of zirconium, cerium, lanthanum, barium, and neodymium. More preferably, the refractory metal oxide support comprised in the in-wall coating comprises an aluminum oxide, more preferably gamma-aluminum oxide.

Preferably, the aluminum oxide comprised in the on-wall coating has a porosity in the range of from 0.2 to 1.5 ml/g, more preferably in the range of from 0.5 to 1.2 ml/g, more preferably in the range of from 0.7 to 1 ml/g, as determined according to Reference Example 1 herein. Preferably, the aluminum oxide comprised in the on-wall coating has a BET specific surface area in the range of from 30 to 250 m$^2$/g, preferably in the range of from 50 to 200 m$^2$/g, more preferably in the range of from 90 to 160 m$^2$/g, as determined according to Reference Example 2 herein. Preferably, from 90 to 100 weight-%, more preferably from 95 to 100 weight-%, more preferably from 99 to 100 weight-% of the aluminum oxide comprised in the on-wall coating consist of gamma-aluminum oxide.

Preferably, the refractory metal oxide support comprised in the in-wall coating comprises a platinum group metal supported thereon. Preferably, said platinum group metal is one or more of ruthenium, palladium, rhodium, platinum, and iridium, more preferably one or more of palladium, rhodium, and platinum, more preferably one or more of palladium and rhodium, more preferably one or more of palladium and rhodium, more preferably rhodium. Preferably, the in-wall coating comprises the platinum group metal supported on the refractory metal oxide support at a loading in the range of from range from 1 to 200 g/ft$^3$, preferably in the range of from 3 to 180 g/ft$^3$, more preferably in the range of from 4 to 150 g/ft$^3$. Preferably, the in-wall coating comprises the refractory metal oxide support at a loading in the range of from 0.1 to 3 g/in$^3$, preferably in the range of from 0.15 to 2.5 g/in$^3$.

Therefore, it is preferred that the in-wall coating comprises a refractory metal oxide support preferably comprising an aluminum oxide, more preferably comprising gamma aluminum oxide, and a platinum group metal, preferably rhodium, supported on said refractory metal oxide support.

Therefore, it is more preferred that the in-wall coating comprises an oxygen storage compound preferably comprising a mixed oxide of cerium and zirconium, and a platinum group metal, preferably palladium, supported on said oxygen storage compound, and comprises a refractory metal oxide support preferably comprising an aluminum oxide, more preferably comprising gamma aluminum oxide, and a platinum group metal, preferably rhodium, supported on said refractory metal oxide support.

Preferably, the in-wall coating further comprises a promotor. The term "promotor" as used in this context of the present invention relates to a compound which promotes the overall catalytic activity. Preferably, the promotor comprises, more preferably is, one or more of a promotor comprising zirconium, preferably a zirconium oxide, a promotor comprising barium, preferably a barium oxide, a promotor comprising strontium, preferably a strontium oxide, a promotor comprising lanthanum, preferably a lanthanum oxide, a promotor comprising neodymium, preferably a neodymium oxide, a promotor comprising yttrium, preferably an yttrium oxide, a promotor comprising praseodymium, preferably a praseodymium oxide. More preferably, the promotor comprises, more preferably is, one or more of a promotor comprising zirconium and a promotor comprising barium. More preferably, the promotor comprised in the in-wall coating consists of a promotor comprising zirconium, preferably a zirconium oxide, and a promotor comprising barium, preferably a barium oxide.

Therefore, it is more preferred that the three-way conversion catalytic in-wall coating comprises a platinum group metal, preferably rhodium, supported on a refractory metal oxide, preferably an aluminum oxide, more preferably gamma aluminum oxide; a platinum group metal, preferably palladium, supported on an oxygen storage compound, preferably an oxygen storage compound comprising cerium, more preferably comprising an oxygen storage compound comprising one or more of a cerium oxide, a mixture of a cerium oxide and a zirconium oxide, and a mixed oxide of cerium and zirconium; and a promotor, preferably one or more of a promotor comprising zirconium, preferably a zirconium oxide, and a promotor comprising barium, preferably a barium oxide.

Preferably, the in-wall coating comprises the promotor at a loading in the range of from 0.01 to 1.8 g/in$^3$, preferably in the range of from 0.05 to 1.5 g/in$^3$, more preferably in the range of from 0.1 to 1.3 g/in$^3$.

Preferably, from 95 to 100 weight-%, preferably from 99 to 100 weight-%, more preferably from 99.9 to 100 weight-% of the three-way conversion catalytic in-wall coating consist of a platinum group metal, preferably rhodium, supported on a refractory metal oxide, preferably an aluminum oxide, more preferably gamma aluminum oxide; a platinum group metal, preferably palladium, supported on an oxygen storage compound, preferably an oxygen storage compound comprising cerium, more preferably comprising an oxygen storage compound comprising one or more of a cerium oxide, a mixture of a cerium oxide and a zirconium oxide, and a mixed oxide of cerium and zirconium; and a promotor, preferably one or more of a promotor comprising zirconium, preferably a zirconium oxide, and a promotor comprising barium, preferably a barium oxide.

According to the present invention, it is preferred that the in-wall coating does comprises one or more zeolitic compounds having a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably having a framework structure type BEA, MFI, CHA, AEI, and/or FAU.

Preferably, from 95 to 100 weight-%, more preferably from 99 to 100 weight-%, more preferably from 99.9 to 100 weight-% of the four-way conversion catalyst consist of the porous wall flow filter substrate, the three-way conversion catalytic in-wall coating and the on-wall coating comprising a porous oxidic compound. More preferably, the four-way conversion catalyst of the present invention consists of the porous wall flow filter substrate, the three-way conversion catalytic in-wall coating and the on-wall coating comprising a porous oxidic compound.

The present invention further relates to a process for preparing the four-way conversion catalyst as described above. Preferably, said process comprises
(i) providing a washcoat slurry comprising a source for a three-way conversion catalytic in-wall coating;
(ii) coating the washcoat of the washcoat slurry provided in (i) onto a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, thus obtaining the wall flow filter substrate wherein the pores of the porous internal walls comprise a three-way conversion catalytic in-wall coating which comprises an oxygen storage compound and a platinum group metal supported on a refractory metal oxide;
(iii) providing a washcoat slurry comprising a source for the on-wall coating comprising a porous oxidic compound;
(iv) coating the washcoat of the washcoat slurry provided in (iii) onto the coated porous wall flow filter substrate obtained from (ii).

Regarding step (i) of said process, no specific restrictions exist provided that from (i), the porous wall flow filter substrate is obtained comprising the in-wall coating within the pores of the wall flow filter substrate. Preferably, (i) comprises
(i.1) impregnating a source of a platinum group metal onto a refractory metal oxide support;
(i.2) admixing the platinum group metal supported on the refractory metal oxide with one or more of an adjuvant and a source for a promotor, preferably with an adjuvant and a source for a promotor; and preferably milling the obtained mixture;
(i.3) impregnating a source of a platinum group metal onto an oxygen storage compound;
(i.4) admixing the platinum group metal supported on the oxygen storage compound with one or more of an adjuvant and a source for a promotor, preferably with an adjuvant and a source for a promotor; and preferably milling the obtained mixture;
(i.5) admixing the mixture obtained from (i.2) and the mixture obtained from (i.4), obtaining the washcoat slurry comprising a source for the three-way conversion catalytic in-wall coating.

With regard to preferred platinum group metals used according to (i.1), reference is made to the respective disclosure above regarding the in-wall coating. Thus, it is preferred that the platinum group metal is one or more of ruthenium, palladium, rhodium, platinum, and iridium, more preferably one or more of palladium, rhodium, and platinum, more preferably one or more of palladium and rhodium, more preferably rhodium. As source of the platinum group metal, it is preferred to employ a salt of a platinum group metal, such as a nitrate salt or a chloride salt. More preferably, the source of a platinum group metal comprises a comprises a nitrate of a platinum group metal, more preferably is a nitrate of a platinum group metal. With regard to preferred refractory metal oxide support used according to (i.1), reference is made to the respective disclosure above regarding the in-wall coating. Thus, it is preferred that the refractory metal oxide support comprises aluminum, more preferably comprises one or more of an aluminum oxide, a mixture a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises an aluminum oxide, more preferably gamma aluminum oxide. Regarding the impregnation according to (i.1), no specific restrictions exist. For example, it is possible to carry out the impregnation via spray-impregnation, via incipient wetness impregnation, and the like. After impregnation and optional drying, it is preferred to subject the refractory metal oxide support impregnated with the source of a platinum group metal to calcination in a suitable gas atmosphere, preferably at a temperature of the gas atmosphere in the range of from 300 to 590° C., more preferably in the range of from 300 to 450° C. Preferably, said gas atmosphere comprises oxygen, wherein more preferably, the gas atmosphere is air, lean air, or oxygen.

According to (i.2), the platinum group metal supported on the refractory metal oxide is admixed with one or more of an adjuvant and a source for a promotor. Preferably, the platinum group metal supported on the refractory metal oxide is admixed with one or more of an adjuvant and a source for a promotor. Preferred adjuvants include, but are not restricted to, one or more of water, a polyacrylate, a methylcellulose, and an alcohol, where as alcohol, octanol, more preferably 1-octanol is preferably employed. With regard to the chemical nature of the promotor, reference is made to reference is made to the respective disclosure above regarding the in-wall coating. Thus, it is preferred that the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium. As source of the promotor, it is preferred to employ a salt of the respective promotor element, such as a nitrate salt or an acetate salt. More preferably, the source of the promotor comprises a comprises a nitrate of the respective promotor element, more preferably is a nitrate of the respective promotor element. According to (i.2), it is preferred to adjust the pH of the obtained mixture to a value in the range of from 2 to 7, preferably in the range of from 2.5 to 6, more preferably in the range of from 3 to 5, as determined by immersing a pH sensitive glass electrode into the obtained mixture. Depending on the pH of the mixture to be adjusted to said value, any conceivable and suitable base or acid can be employed. Preferably, the pH of the obtained suspension is adjusted by adding an inorganic and/or an organic acid, preferably an organic acid, more preferably acetic acid. Preferably, the pH is adjusted prior to milling, if milling is carried out. Depending on the particle size distribution of the particles of the mixture obtained in (i.2), it may be preferred to subject said mixture to milling in order to achieve a particle size distribution which allows the particles to permeate the pores of the porous walls of the porous wall flow filter substrate and to form the in-wall coating in said pores. Generally, the desired particle size distribution will depend on the porosity characteristics of the respective wall flow filter substrate. Preferably, according to (i.2), the mixture is milled so that the particle size distribution of the particles of the mixture is characterized by a Dv90 value which is smaller than the average pore size of the pores of the porous wall-flow substrate, wherein the Dv90 value is preferably in the range of from 0.1 to 15 micrometer, more preferably in the range of from 2.5 to 8 micrometer, as determined as described in Reference Example 4 herein. Regarding the milling, every conceivable method can be used leading to the desired particle size distribution.

According to (i.3), a source of a platinum group metal is impregnated onto an oxygen storage compound. With regard to preferred platinum group metals used according to (i.1), reference is made to the respective disclosure above regarding the in-wall coating. Thus, it is preferred that the platinum group metal is one or more of ruthenium, palladium, rhodium, platinum, and iridium, more preferably one or more of palladium, rhodium, and platinum, more preferably one or more of palladium and rhodium, more preferably palladium. As source of the platinum group metal, it is preferred to employ a salt of a platinum group metal, such as a nitrate salt or a chloride salt. More preferably, the source of a platinum group metal comprises a comprises a nitrate of a platinum group metal, more preferably is a nitrate of a platinum group metal. With regard to preferred oxygen storage compound used according to (i.3), reference is made to the respective disclosure above regarding the in-wall coating. Thus, it is preferred that the oxygen storage compound comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium and praseodymium, wherein more preferably, the oxygen storage compound comprises one or more of a cerium oxide, a mixture of a cerium oxide and a zirconium oxide, and a mixed oxide of cerium and zirconium. Regarding the impregnation according to (i.3), no specific restrictions exist. For example, it is possible to carry out the impregnation via spray-impregnation, via incipient wetness impregnation, and the like. After impregnation and optional drying, it is preferred to subject the refractory metal oxide support impregnated with the source of a platinum group metal to calcination in a suitable gas atmosphere, preferably at a temperature of the gas atmosphere in the range of from 300 to 590° C., more preferably in the range of from 300 to 450° C. Preferably, said gas atmosphere comprises oxygen, wherein more preferably, the gas atmosphere is air, lean air, or oxygen.

According to (i.4), the platinum group metal supported on the oxygen storage compound is admixed with one or more of an adjuvant and a source for a promotor. Preferably, the platinum group metal supported on the oxygen storage compound. Preferred adjuvants include, but are not restricted to, one or more of water, a polyacrylate, a methyl cellulose, and an alcohol, where as alcohol, octanol, more preferably 1-octanol is preferably employed. With regard to the chemical nature of the promotor, reference is made to the respective disclosure above regarding the in-wall coating. Thus, it is preferred that the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium. As source of the promotor, it is preferred to employ a salt of the respective promotor element, such as a nitrate salt or an acetate salt. More preferably, the source of the promotor comprises a comprises a nitrate of the respective promotor element, more preferably is a nitrate of the respective promotor element. According to (i.4), it is preferred to adjust the pH of the obtained mixture to a value in the range of from 2 to 7, preferably in the range of from 2.5 to 6, more preferably in the range of from 3 to 5, as determined by immersing a pH sensitive glass electrode into the obtained mixture. Depending on the pH of the mixture to be adjusted to said value, any conceivable and suitable base or acid can be employed. Preferably, the pH of the obtained suspension is adjusted by adding an inorganic and/or an organic acid, preferably an organic acid, more preferably acetic acid. Preferably, the pH is adjusted prior to milling, if milling is carried out. Depending on the particle size distribution of the particles of the mixture obtained in (i.2), it may be preferred to subject said mixture to milling in order to achieve a particle size distribution which allows the particles to permeate the pores of the porous walls of the porous wall flow filter substrate and to form the in-wall coating in said pores. Generally, the desired particle size distribution will depend on the porosity characteristics of the respective wall flow filter substrate. Preferably, according to (i.4), the mixture is milled so that the particle size distribution of the particles of the mixture is characterized by a Dv90 value which is smaller than the average pore size of the pores of the porous wall-flow substrate, wherein the Dv90 value is preferably in the range of from 0.1 to 15 micrometer, more preferably in the range of from 2.5 to 8 micrometer, as determined as described in Reference Example 4 herein. Regarding the milling, every conceivable method can be used leading to the desired particle size distribution.

According to (i.5), the preferably milled mixture obtained from (i.2) and the preferably milled mixture obtained from (i.4) are admixed with each other, and the washcoat slurry comprising a source for the three-way conversion catalytic in-wall coating is obtained which is then subjected to (ii) where the washcoat of the washcoat slurry provided in (i) is coated onto the porous wall flow filter substrate. Preferably, the pores of the porous internal walls of the porous wall-flow substrate employed according to (ii) have an average pore size of less than 30 micrometer, preferably in the range of from 6 to 28 micrometer, more preferably in the range of from 8 to 25 micrometer, more preferably in the range of from 10 to 23 micrometer, as determined according to Reference Example 3 herein. Preferably, the porous internal walls of the wall-flow substrate have an average porosity in the range of from 20 to 75%, more preferably in the range of from 30 to 70%, more preferably in the range of from 40 to 65%, as determined according to Reference Example 3 herein. Preferred ranges are, for example, from 40 to 50% or from 45 to 55% or from 50 to 60% or from 55 to 65%. With regard to the chemical nature of the promotor, reference is made to the respective disclosure above regarding the in-wall coating. Thus, it is preferred that the wall-flow substrate comprises, preferably consists of a cordierite, a silicon carbide, or an aluminum titanate.

Preferably, according to (ii), the washcoat of the washcoat slurry provided in (i) is coated onto the pores of the porous wall flow filter substrate by immersing the porous wall flow filter substrate into the washcoat slurry, exposing the porous wall flow filter substrate to the washcoat slurry for a period of time, and removing the porous wall flow filter substrate from the washcoat slurry. Preferred periods of time are in the range of from 0.02 to 2 min, more preferably in the range of from 0.05 to 1.5 min, more preferably in the range of from 0.1 to 1 min. Exposing the porous wall flow filter substrate to the washcoat slurry for a period of time, and removing the porous wall flow filter substrate from the washcoat slurry may be repeated at least once. After an optional drying, the porous wall flow filter substrate removed from the washcoat slurry is preferably subjected to calcination in a suitable gas atmosphere, preferably at a temperature of the gas atmosphere in the range of from 300 to 590° C., more preferably in the range of from 300 to 450° C. Preferably, said gas atmosphere comprises oxygen, wherein more preferably, the gas atmosphere is air, lean air, or oxygen. According to the present invention, it is possible to coat the washcoat slurry obtained from (ii) onto the pores of the porous wall flow filter substrate via the inlet passages or via the outlet passages or via both the inlet passages and the outlet passages, preferably via both the inlet passages and the outlet passages.

According to (iii), a washcoat slurry comprising a source for the on-wall coating comprising a porous oxidic compound is provided. Preferably, (iii) comprises
(iii.1) preparing a suspension, preferably an aqueous suspension, comprising admixing a porous oxidic compound with an adjuvant;
(iii.2) milling the suspension obtained from (iii.1).

Preferred adjuvants according to (iii.1) include, but are not restricted to, one or more of water, a polyacrylate, a methylcellulose, and an alcohol, where as alcohol, octanol, more preferably 1-octanol is preferably employed. Prior to milling according to (iii.2), it is preferred to adjust the pH of the obtained mixture to a value in the range of from 2 to 7, preferably in the range of from 2.5 to 6, more preferably in the range of from 3 to 5, as determined by immersing a pH sensitive glass electrode into the obtained mixture. Depending on the pH of the mixture to be adjusted to said value, any conceivable and suitable base or acid can be employed. Preferably, the pH of the obtained suspension is adjusted by adding an inorganic and/or an organic acid, preferably an organic acid, more preferably acetic acid.

According to (iii.1), it may be preferred that a suspension is prepared comprising admixing the porous oxidic compound with an adjuvant and with a source for a promotor. With regard to the chemical nature of the promotor, reference is made to the respective disclosure above regarding the in-wall coating. Thus, it is preferred that the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium. As source of the promotor, it is preferred to employ a salt of the respective promotor element, such as a nitrate salt or an acetate salt. More preferably, the source of the promotor comprises a comprises a nitrate of the respective promotor element, more preferably is a nitrate of the respective promotor element.

The porous oxidic compound comprised in the on-wall coating preferably comprises one or more of an oxygen storage compound and a refractory metal oxide. With regard to the chemical nature of the oxygen storage compound, reference is made to the respective disclosure above regarding the on-wall coating. Thus, it is preferred that the oxygen storage compound comprises cerium, more preferably comprises one or more of a cerium oxide, a mixture of oxides comprising a cerium oxide, and a mixed oxide comprising cerium, wherein the mixed oxide comprising cerium more preferably additionally comprises one or more of zirconium and praseodymium, wherein more preferably, the oxygen storage compound comprises one or more of a cerium oxide, a mixture of a cerium oxide and a zirconium oxide, and a mixed oxide of cerium and zirconium, wherein more preferably, the oxygen storage compound comprises a mixed oxide of cerium and zirconium. Further preferably, the oxygen storage compound has a porosity in the range of from 0.1 to 1.2 ml/g preferably in the range of from 0.2 to 0.8 ml/g, more preferably in the range of from 0.3 to 0.6 ml/g, as determined according to Reference Example 1 herein. Further preferably, the oxygen storage compound has a BET specific surface area in the range of from 15 to 150 $m^2/g$, preferably in the range of from 30 to 100 $m^2/g$, more preferably in the range of from 50 to 80 $m^2/g$, as determined according to Reference Example 2 herein. With regard to the chemical nature of the refractory metal oxide, reference is made to the respective disclosure above regarding the on-wall coating. Thus, it is preferred that the refractory metal comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide comprises an aluminum oxide. Further preferably, the aluminum oxide has a porosity in the range of from 0.2 to 1.5 ml/g preferably in the range of from 0.5 to 1.2 ml/g, more preferably in the range of from 0.7 to 1 ml/g, as determined according to Reference Example 1 herein. Further preferably, the aluminum oxide has a BET specific surface area in the range of from 30 to 250 $m^2/g$, preferably in the range of from 50 to 200 $m^2/g$, more preferably in the range of from 90 to 160 $m^2/g$, as determined according to Reference Example 2 herein. It is preferred that from 90 to 100 weight-%, more preferably from 95 to 100 weight-%, preferably from 99 to 100 weight-% of the aluminum oxide comprised in the on-wall coating consist of gamma-aluminum oxide.

It may be preferred that in addition to the preferred refractory oxide and the preferred oxygen storage compound, the suspension provided in (iii), preferably prepared in (iii.1), comprises a zeolitic compound, preferably having a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably having a framework structure type BEA, MFI, CHA, AEI, and/or FAU.

Depending on the particle size distribution of the particles of the mixture obtained in (iii.1), it is preferred to subject said mixture to milling in order to achieve a particle size distribution which prevents the the particles to permeate into the pores of the porous walls of the porous wall flow filter substrate comprising the in-wall coating and to form the on-wall coating on the surface of the walls of the wall flow filter substrate. Generally, the desired particle size distribution will depend on the porosity characteristics of the respective wall flow filter substrate comprising the in-wall coating. Preferably, according to (iii.2), the mixture is milled so that the particle size distribution of the particles of the mixture is characterized by a Dv90 value which is greater than the average pore size of the coated pores of the porous wall flow filter substrate obtained from (ii), wherein the Dv90 value is preferably in the range of from 14 to 50 micrometer, more preferably in the range of from 18 to 44 micrometer, determined as described in Reference Example 4 herein. Regarding the milling, every conceivable method can be used leading to the desired particle size distribution.

According to (iv), the washcoat of the washcoat slurry provided in (iii) is coated onto the surface of the walls of the coated porous wall flow filter substrate obtained from (ii).

Preferably, according to (iv), the washcoat of the washcoat slurry provided in (iii) is coated onto the surface of the walls of the porous wall flow filter substrate by immersing the porous wall flow filter substrate obtained from (ii) into the washcoat slurry, exposing the porous wall flow filter substrate to the washcoat slurry for a period of time, and removing the porous wall flow filter substrate from the washcoat slurry. Preferred periods of time are in the range of from 0.02 to 2 min, more preferably in the range of from 0.05 to 1.5 min, more preferably in the range of from 0.1 to 1 min. Exposing the porous wall flow filter substrate to the washcoat slurry for a period of time, and removing the porous wall flow filter substrate from the washcoat slurry may be repeated at least once. After an optional drying, the porous wall flow filter substrate removed from the washcoat slurry is preferably subjected to calcination in a suitable gas atmosphere, preferably at a temperature of the gas atmosphere in the range of from 300 to 590° C., more preferably in the range of from 300 to 450° C. Preferably, said gas atmosphere comprises oxygen, wherein more preferably, the gas atmosphere is air, lean air, or oxygen. In view of the fact that from milling according to (iii), particles are obtained the size of which is characterized by a particle size distribution, a certain portion of the particles may exhibit a size which is small enough to result, after (iv), in pores of the porous wall-flow substrate comprising, in addition to the in-wall coating applied according to (ii), these particles or a portion thereof.

According to the present invention, it is possible to coat the washcoat slurry obtained from (iii) onto the surface of the porous wall flow filter substrate via the inlet passages or via the outlet passages or via both the inlet passages and the outlet passages, preferably via the inlet passages or via the outlet passages. Preferred coatings are described in detail hereinabove. Thus, according to a first preferred embodiment, the coating is applied in (iv) so that the on-wall coating comprises an inlet on-wall coating wherein it is preferred that $0<x\le100$, more preferably $50\le x\le100$, more preferably $75\le x\le100$, more preferably $90\le x\le100$, more preferably $95\le x\le100$, more preferably $98\le x\le100$, more preferably $99\le x\le100$. According to this embodiment, it is preferred that, with regard to the outlet on-wall coating, $0\le y\le5$, more preferably $y=0$. Thus, it is preferred that the on-wall coating consists of the inlet on-wall coating. Thus, according to a second preferred embodiment, the coating is applied in (iv) so that the on-wall coating comprises an outlet on-wall coating wherein it is preferred that $0<y\le100$, more preferably $50\le y\le100$, more preferably $75\le y\le100$, more preferably $90\le y\le100$, more preferably $95\le y\le100$, more preferably $98\le y\le100$, more preferably $99\le y\le100$. According to this embodiment, it is preferred that, with regard to the inlet on-wall coating, $0\le x\le5$, more preferably $x=0$. Thus, it is preferred that the on-wall coating consists of the outlet on-wall coating. Thus, according to a conceivable embodiment, the on-wall coating comprises an inlet on-wall coating and an outlet on-wall coating wherein it may be preferred that 0<y≤100, preferably 50≤y≤100, more preferably 75≤y≤100, more preferably 90≤y≤100, more preferably 95≤y≤100, more preferably 98≤y≤100, more preferably 99≤y≤100, and that 0≤x≤100, preferably 50≤x≤100, more preferably 75≤x≤100, more preferably 90≤x≤100, more preferably 95≤x≤100, more preferably 98≤x≤100, more preferably 99≤x≤100.

Further, the present invention relates to a four-way conversion catalyst for the treatment of an exhaust gas stream of a gasoline engine, which catalyst is obtainable or obtained or preparable or prepared by a process as described above.

Yet further, the present invention relates to an exhaust gas treatment system downstream of a gasoline engine and in fluid communication with said gasoline engine, wherein the system comprises a four-way conversion catalyst as described hereinabove. Yet further, the present invention relates to the use of a four-way conversion catalyst as described above for the treatment of an exhaust gas stream from a gasoline engine, and to a method of treating an exhaust gas stream from a gasoline engine, comprising passing said exhaust gas stream through a four-way conversion catalyst as described above. Preferably, the gasoline engine is a gasoline direct injection engine, and the exhaust gas stream of the gasoline engine preferably comprises hydrocarbon (HC), carbon monoxide (CO), nitrogen oxides (NOx), and particulates.

The units inch (abbreviated as in) and foot (abbreviated as ft) as disclosed herein refer to units of length in the imperial and United States customary systems of measurements. There are 12 inches in a foot. One inch is equal to 2.54 cm.

The present invention is further illustrated by the following set of embodiments and combinations of embodiments resulting from the dependencies and back-references as indicated. In particular, it is noted that in each instance where a range of embodiments is mentioned, for example in the context of a term such as "The four-way conversion catalyst of any one of embodiments 1 to 4", every embodiment in this range is meant to be explicitly disclosed for the skilled person, i.e. the wording of this term is to be understood by the skilled person as being synonymous to "The four-way conversion catalyst of any one of embodiments 1, 2, 3, and 4".

1. A four-way conversion catalyst for the treatment of an exhaust gas stream of a gasoline engine, the catalyst comprising
    a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
    wherein the pores of the porous internal walls comprise a three-way conversion catalytic in-wall coating which comprises an oxygen storage compound and a platinum group metal supported on a refractory metal oxide;
    wherein on at least a portion of the surface of the porous internal walls, which surface defines the interface between the porous internal walls and the passages, the catalyst comprises a porous on-wall coating extending from said surface of the internal walls to the passage, which on-wall coating comprises a porous oxidic compound and has a platinum group metal content in the range of from 0 to 0.001 weight-%, based on the total weight of the on-wall coating.

2. The four-way conversion catalyst of embodiment 1, wherein the platinum group metal comprised in the on-wall coating at a platinum group metal content in the range of from 0 to 0.001 weight-% is one or more of ruthenium, palladium, rhodium, platinum, and iridium, and wherein said platinum group metal content is preferably in the range of from 0 to 0.0001 weight-%, more preferably in the range of from 0 to 0.00001 weight-%.

3. The four-way conversion catalyst of embodiment 1 or 2, wherein the porous oxidic compound comprised in the on-wall coating comprises one or more of an oxygen storage compound and a refractory metal oxide.

4. The four-way conversion catalyst of embodiment 3, wherein the oxygen storage compound comprised in the on-wall coating comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium and praseodymium, wherein more preferably, the oxygen storage compound comprised in the on-wall coating comprises one or more of a cerium oxide, a mixture of a cerium oxide and a zirconium oxide, and a mixed oxide of cerium and zirconium, wherein more preferably, the oxygen storage compound comprised in the on-wall coating comprises a mixed oxide of cerium and zirconium.

5. The four-way conversion catalyst of embodiment 4, wherein the oxygen storage compound comprised in the on-wall coating has a porosity in the range of from 0.1 to 1.2 ml/g preferably in the range of from 0.2 to 0.8 ml/g, more preferably in the range of from 0.3 to 0.6 ml/g, as determined according to Reference Example 1 herein.

6. The four-way conversion catalyst of embodiment 4 or 5, wherein the oxygen storage compound comprised in the on-wall coating has a BET specific surface area in the range of from 15 to 150 $m^2/g$, preferably in the range of from 30 to 100 $m^2/g$, more preferably in the range of from 50 to 80 $m^2/g$, as determined according to Reference Example 2 herein.

7. The four-way conversion catalyst of any one of embodiments 3 to 6, wherein the refractory metal oxide comprised in the on-wall coating comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide comprised in the on-wall coating comprises an aluminum oxide.

8. The four-way conversion catalyst of embodiment 7, wherein the aluminum oxide has a porosity in the range of from 0.2 to 1.5 ml/g preferably in the range of from 0.5 to 1.2 ml/g, more preferably in the range of from 0.7 to 1 ml/g, as determined according to Reference Example 1 herein.

9. The four-way conversion catalyst of embodiment 7 or 8, wherein the aluminum oxide has a BET specific surface area in the range of from 30 to 250 $m^2/g$, preferably in the range of from 50 to 200 $m^2/g$, more preferably in the range of from 90 to 160 $m^2/g$, as determined according to Reference Example 2 herein.

10. The four-way conversion catalyst of any one of embodiments 7 to 9, wherein from 90 to 100 weight-%, preferably from 95 to 100 weight-%, more preferably from 99 to 100 weight % of the aluminum oxide comprised in the on-wall coating consist of gamma-aluminum oxide.
11. The four-way conversion catalyst of any one of embodiments 1 to 10, wherein from 95 to 100 weight-%, preferably from 99 to 100 weight-%, more preferably from 99.9 to 100 weight-% of the the on-wall coating consists of the porous oxidic compound.
12. The four-way conversion catalyst of any one of embodiments 1 to 10, wherein the on-wall coating further comprises a promotor, wherein the promotor is preferably one or more of a promotor comprising zirconium, preferably a zirconium oxide, a promotor comprising barium, preferably a barium oxide, a promotor comprising strontium, preferably a strontium oxide, a promotor comprising lanthanum, preferably a lanthanum oxide, a promotor comprising neodymium, preferably a neodymium oxide, a promotor comprising yttrium, preferably an yttrium oxide, a promotor comprising praseodymium, preferably a praseodymium oxide, wherein more preferably, the promotor comprises one or more of a promotor comprising zirconium and a promotor comprising barium.
13. The four-way conversion catalyst of embodiment 12, wherein the promotor comprised in the on-wall coating consists of a promotor comprising zirconium, preferably a zirconium oxide, and a promotor comprising barium, preferably a barium oxide.
14. The four-way conversion catalyst of embodiment 12 or 13, wherein in the on-wall coating, the weight ratio of the porous oxidic compound relative to the promotor is in the range of from 20:1 to 0.2:1, preferably in the range of from 15:1 to 1:1, more preferably in the range of from 12:1 to 5:1.
15. The four-way conversion catalyst of any one of embodiments 12 to 14, wherein from 95 to 100 weight-%, preferably from 99 to 100 weight-%, more preferably from 99.9 to 100 weight-% of the on-wall coating consists of the porous oxidic compound and the promotor.
16. The four-way conversion catalyst of any one of embodiments 1 to 15, wherein the on-wall coating further comprises a zeolitic compound, preferably having a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably having a framework structure type BEA, MFI, CHA, AEI, and/or FAU.
17. The four-way conversion catalyst of embodiment 16, wherein from 95 to 100 weight-%, preferably from 99 to 100 weight-%, more preferably from 99.9 to 100 weight-% of the on-wall coating consist of the porous oxidic compound, the zeolitic compound, and optionally the promotor as defined in any one of embodiments 12 to 14.
18. The four-way conversion catalyst of any one of embodiments 1 to 17, wherein the on-wall coating comprising porous oxidic compound comprises, preferably consists of, an inlet on-wall coating comprising a porous oxidic compound, or an outlet on-wall coating comprising porous oxidic compound, or an inlet on-wall coating comprising a porous oxidic compound and an outlet on-wall coating comprising porous oxidic compound;
wherein the internal walls defining the inlet passages comprise the inlet on-wall coating comprising a porous oxidic compound, wherein the inlet on-wall coating length is x % of the substrate axial length wherein 0≤x≤100;
wherein the internal walls defining the outlet passages comprise the outlet on-wall coating comprising a porous oxidic compound, wherein the outlet on-wall coating length is y % of the substrate axial length wherein 0≤y≤100;
wherein x+y>0.
19. The four-way conversion catalyst of embodiment 18, wherein 0<x≤100, preferably 50≤x≤100, more preferably 75≤x≤100, more preferably 90≤x≤100, more preferably 95≤x≤100.
20. The four-way conversion catalyst of embodiment 19, wherein 0≤y≤5, preferably y=0.
21. The four-way conversion catalyst of embodiment 19 or 20, wherein 99≤x≤100 and y=0.
22. The four-way conversion catalyst of embodiment 18 or 19, wherein 0<y≤100, preferably 50≤y≤100, more preferably 75≤y≤100, more preferably 90≤y≤100, more preferably 95≤y≤100.
23. The four-way conversion catalyst of embodiment 22, wherein 0≤x≤5, preferably x=0.
24. The four-way conversion catalyst of embodiment 22 or 23, wherein 99≤y≤100 and x=0.
25. The four-way conversion catalyst of any one of embodiments 1 to 24, comprising the on-wall coating at a loading in the range of from 0.01 to 1.5 g/in$^3$, preferably in the range of from 0.02 to 1.0 g/in$^3$, more preferably in the range of from 0.05 to 0.5 g/in$^3$.
26. The four-way conversion catalyst of any one of embodiments 1 to 25, wherein the porous internal walls comprising the three-way conversion catalytic in-wall coating have an average porosity which is in the range of from 80 to 99%, preferably in the range of from 85 to 95% of the average porosity of the porous internal wall which do not comprise the three-way conversion catalytic in-wall coating, wherein the average porosity of the porous internal wall which do not comprise the three-way conversion catalytic in-wall coating is in the range of from 20 to 75%, preferably in the range of from 30 to 70%, more preferably in the range of from 40 to 65%, as determined according to Reference Example 3 herein.
27. The four-way conversion catalyst of any one of embodiments 1 to 26, wherein the pores of the porous internal walls comprising the three-way conversion catalytic in-wall coating have an average pore size which is in the range of from 80 to 99%, preferably in the range of from 85 to 95% of the average pore size of the pores of the porous internal wall which do not comprise the three-way conversion catalytic in-wall coating, wherein the average pore size of the pores of the porous internal wall which do not comprise the three-way conversion catalytic in-wall coating is less than 30 micrometer, preferably in the range of from 10 to 23 micrometer, as determined according to Reference Example 3 herein.
28. The four-way conversion catalyst of any one of embodiments 1 to 27, wherein the wall-flow substrate comprises, preferably consists of a cordierite, a silicon carbide, or an aluminum titanate.
29. The four-way conversion catalyst of any one of embodiments 1 to 28, comprising the three-way conversion catalytic in-wall coating at a loading in the range of from 0.1 to 5 g/in$^3$, preferably in the range of from 0.2 to 4 g/in$^3$, more preferably in the range of from 0.3 to 3.0 g/in$^3$.
30. The four-way conversion catalyst of any one of embodiments 1 to 29, wherein the three-way conversion catalytic in-wall coating comprises a hydrocarbon (HC) oxidation component, a carbon monoxide (CO) oxidation component, and a nitrogen oxide (NOx) reduction component.
31. The four-way conversion catalyst of any one of embodiments 1 to 30, wherein the three-way conversion catalytic in-wall coating comprises one or more platinum group metals, preferably one or more of ruthenium, palladium, rhodium, platinum, and iridium, more preferably one or more of palladium, rhodium, and platinum, more preferably one or more of palladium and rhodium, more preferably palladium and rhodium.
32. The four-way conversion catalyst of any one of embodiments 1 to 31, wherein the three-way conversion catalytic in-wall coating comprises an oxygen storage compound, wherein the oxygen storage compound preferably comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium and praseodymium, wherein more preferably, the oxygen storage compound comprises one or more of a cerium oxide, a mixture of a cerium oxide and a zirconium oxide, and a mixed oxide of cerium and zirconium.
33. The four-way conversion catalyst of any one of embodiments 1 to 32, wherein the three-way conversion catalytic in-wall coating comprises a refractory metal oxide support, wherein the refractory metal oxide support comprising aluminum preferably comprises one or more of an aluminum oxide, a mixture a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises an aluminum oxide, more preferably gamma aluminum oxide.
34. The four-way conversion catalyst of any one of embodiments 1 to 33, wherein the three-way conversion catalytic in-wall coating comprises a promotor, wherein the promotor is preferably one or more of a promotor comprising zirconium, preferably a zirconium oxide, a promotor comprising barium, preferably a barium oxide, a promotor comprising strontium, preferably a strontium oxide, a promotor comprising lanthanum, preferably a lanthanum oxide, a promotor comprising neodymium, preferably a neodymium oxide, a promotor comprising yttrium, preferably an yttrium oxide, a promotor comprising praseodymium, preferably a praseodymium oxide, wherein more preferably, the promotor comprises one or more of a promotor comprising zirconium and a promotor comprising barium.
35. The four-way conversion catalyst of any one of embodiments 1 to 34, wherein the three-way conversion catalytic in-wall coating comprises a platinum group metal, preferably rhodium, supported on a refractory metal oxide, preferably an aluminum oxide, more preferably gamma aluminum oxide; a platinum group metal, preferably palladium, supported on an oxygen storage compound, preferably an oxygen storage compound comprising cerium, more preferably comprising an oxygen storage compound comprising one or more of a cerium oxide, a mixture of a cerium oxide and a zirconium oxide, and a mixed oxide of cerium and zirconium; and a promotor, preferably one or more of a promotor comprising zirconium, preferably a zirconium oxide, and a promotor comprising barium, preferably a barium oxide.
36. The four-way conversion catalyst of any one of embodiments 1 to 35, wherein from 95 to 100 weight-%, preferably from 99 to 100 weight-%, more preferably from 99.9 to 100 weight-% of the three-way conversion catalytic in-wall coating consist of a platinum group metal, preferably rhodium, supported on a refractory metal oxide, preferably an aluminum oxide, more preferably gamma aluminum oxide; a platinum group metal, preferably palladium, supported on an oxygen storage compound, preferably an oxygen storage compound comprising cerium, more preferably comprising an oxygen storage compound comprising one or more of a cerium oxide, a mixture of a cerium oxide and a zirconium oxide, and a mixed oxide of cerium and zirconium; and a promotor, preferably one or more of a promotor comprising zirconium, preferably a zirconium oxide, and a promotor comprising barium, preferably a barium oxide.
37. The four-way conversion catalyst of any one of embodiments 1 to 36, wherein the three-way conversion catalytic in-wall coating consists of a platinum group metal, preferably rhodium, supported on a refractory metal oxide, preferably an aluminum oxide, more preferably gamma aluminum oxide; a platinum group metal, preferably palladium, supported on an oxygen storage compound, preferably an oxygen storage compound comprising cerium, more preferably comprising an oxygen storage compound comprising one or more of a cerium oxide, a mixture of a cerium oxide and a zirconium oxide, and a mixed oxide of cerium and zirconium; and a promotor, preferably one or more of a promotor comprising zirconium, preferably a zirconium oxide, and a promotor comprising barium, preferably a barium oxide.
38. The four-way conversion catalyst of any one of embodiments 1 to 37, wherein from 95 to 100 weight-%, preferably from 99 to 100 weight-%, more preferably from 99.9 to 100 weight-% of the four-way conversion catalyst consist of the porous wall flow filter substrate, the three-way conversion catalytic in-wall coating and the on-wall coating comprising a porous oxidic compound.
39. The four-way conversion catalyst of any one of embodiments 1 to 38, consisting of the porous wall flow filter substrate, the three-way conversion catalytic in-wall coating and the on-wall coating comprising a porous oxidic compound.
40. The four-way conversion catalyst of any one of embodiments 1 to 39, wherein the in-wall coating comprises a platinum group metal supported on a refractory metal oxide support at a loading in the range of from 1 to 200 g/ft³, preferably in the range of from 3 to 180 g/ft³, more preferably in the range of from 4 to 150 g/ft³ and said refractory metal oxide support at a loading in the range of from 0.1 to 3 g/in³, preferably in the range of from 0.15 to 2.5 g/in³, more preferably in the range of from 0.2 to 2 g/in³; wherein the in-wall coating further comprises a platinum group metal supported on an oxygen storage compound at a loading in the range of from 1 to 200 g/ft³, preferably in the range of from 3 to 180 g/ft³, more preferably in the range of from 4 to 150 g/ft³, and said oxygen storage compound at a loading in the range of from 0.1 to 3 g/in³, preferably in the range of from 0.15 to 2.5 g/in³, more preferably in the range of from 0.2 to 2 g/in³; wherein the in-wall coating further comprises a promotor at a loading in the range of from 0.01 to 1.8 g/in³, preferably in the range of from 0.05 to 1.5 g/in³, more preferably in the range of from 0.1 to 1.3 g/ft³.

41. A process for preparing the four-way conversion catalyst of any one of embodiments 1 to 40, comprising
    (i) providing a washcoat slurry comprising a source for a three-way conversion catalytic in-wall coating;
    (ii) coating the washcoat of the washcoat slurry provided in (i) onto a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, obtaining the wall flow filter substrate wherein the pores of the porous internal walls comprise a three-way conversion catalytic in-wall coating which comprises an oxygen storage compound and a platinum group metal supported on a refractory metal oxide;
    (iii) providing a washcoat slurry comprising a source for the on-wall coating comprising a porous oxidic compound;
    (iv) coating the washcoat of the washcoat slurry provided in (iii) onto the coated porous wall flow filter substrate obtained from (ii).
42. The process of embodiment 41, wherein (i) comprises
    (i.1) impregnating a source of a platinum group metal onto a refractory metal oxide support;
    (i.2) admixing the platinum group metal supported on the refractory metal oxide with one or more of an adjuvant and a source for a promotor, preferably with an adjuvant and a source for a promotor; and preferably milling the obtained mixture;
    (i.3) impregnating a source of a platinum group metal onto an oxygen storage compound;
    (i.4) admixing the platinum group metal supported on the oxygen storage compound with one or more of an adjuvant and a source for a promotor, preferably with an adjuvant and a source for a promotor; and preferably milling the obtained mixture;
    (i.5) admixing the mixture obtained from (i.2) and the mixture obtained from (i.4), obtaining the washcoat slurry comprising a source for the three-way conversion catalytic in-wall coating.
43. The process of embodiment 42, wherein according to (i.1), the platinum group metal is one or more of ruthenium, palladium, rhodium, platinum, and iridium, more preferably one or more of palladium, rhodium, and platinum, more preferably one or more of palladium and rhodium, more preferably rhodium.
44. The process of embodiment 42 or 43, wherein according to (i.1), the source of a platinum group metal comprises a salt of a platinum group metal, preferably comprises a nitrate of a platinum group metal.
45. The process of any one of embodiments 42 to 44, wherein according to (i.1), the refractory metal oxide support comprises aluminum, preferably comprises one or more of an aluminum oxide, a mixture a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises an aluminum oxide, more preferably gamma aluminum oxide.
46. The process of any one of embodiments 42 to 45, wherein prior to (i.2), the refractory metal oxide source impregnated with the source of a platinum group metal is calcined in a gas atmosphere, preferably at a temperature of the gas atmosphere in the range of from 300 to 590° C., more preferably in the range of from 300 to 450° C., the gas atmosphere preferably comprising oxygen.
47. The process of any one of embodiments 42 to 46, wherein according to (i.2), the adjuvant is one or more of water, a polyacrylate, a methylcellulose, and an alcohol, preferably octanol, wherein more preferably, the adjuvant is one or more of water and an alcohol, preferably octanol.
48. The process of any one of embodiments 42 to 47, wherein according to (i.2), preferably prior to milling, the pH of the obtained mixture is adjusted to a value in the range of from 2 to 7, preferably in the range of from 2.5 to 6, more preferably in the range of from 3 to 5, as determined by immersing a pH sensitive glass electrode into the obtained mixture.
49. The process of any one of embodiments 42 to 48, wherein according to (i.2), the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.
50. The process of embodiment 49, wherein according to (i.2), the source for a promotor comprises a salt, preferably a nitrate, of the respective promotor element, more preferably zirconium nitrate and barium nitrate.
51. The process of any one of embodiments 42 to 50, wherein according to (i.2), the mixture is milled so that the particle size distribution of the particles of the mixture is characterized by a Dv90 value which is smaller than the average pore size of the pores of the porous wall-flow substrate, wherein the Dv90 value is preferably in the range of from 0.1 to 15 micrometer, more preferably in the range of from 2.5 to 8 micrometer, determined as described in Reference Example 4 herein.
52. The process of any one of embodiments 42 to 51, wherein according to (i.3), the platinum group metal is one or more of ruthenium, palladium, rhodium, platinum, and iridium, more preferably one or more of palladium, rhodium, and platinum, more preferably one or more of palladium and rhodium, more preferably palladium.

53. The process of any one of embodiments 42 to 52, wherein according to (i.3), the source of a platinum group metal comprises a salt of a platinum group metal, preferably comprises a nitrate of a platinum group metal.

54. The process of any one of embodiments 42 to 53, wherein according to (i.3), the oxygen storage compound comprises cerium, preferably comprises one or more of a cerium oxide, a mixture of oxides comprising a cerium oxide, and a mixed oxide comprising cerium, wherein the mixed oxide comprising cerium preferably additionally comprises one or more of zirconium and praseodymium, wherein more preferably, the oxygen storage compound comprises one or more of a cerium oxide, a mixture of a cerium oxide and a zirconium oxide, and a mixed oxide of cerium and zirconium.

55. The process of any one of embodiments 42 to 54, wherein prior to (i.3), the oxygen storage compound impregnated with the source of a platinum group metal is calcined in a gas atmosphere, preferably at a temperature of the gas atmosphere in the range of from 300 to 590° C., more preferably in the range of from 300 to 450° C., the gas atmosphere preferably comprising oxygen.

56. The process of any one of embodiments 42 to 55, wherein according to (i.4), the adjuvant is one or more of water, a polyacrylate, a methylcellulose, and an alcohol, preferably octanol, wherein more preferably, the adjuvant is one or more of water and an alcohol, preferably octanol.

57. The process of any one of embodiments 42 to 56, wherein according to (i.4), preferably prior to milling, the pH of the obtained mixture is adjusted to a value in the range of from 2 to 7, preferably in the range of from 2.5 to 6, more preferably in the range of from 3 to 5, as determined by immersing a pH sensitive glass electrode into the obtained mixture.

58. The process of any one of embodiments 42 to 57, wherein according to (i.4), the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

59. The process of embodiment 58, wherein according to (i.4), the source for a promotor comprises a salt, preferably a nitrate, of the respective promotor element, more preferably zirconium nitrate and barium nitrate.

60. The process of any one of embodiments 42 to 59, wherein according to (i.4), the mixture is milled so that the particle size distribution of the particles of the mixture is characterized by a Dv90 value which is smaller than the average pore size of the pores of the porous wall-flow substrate, wherein the Dv90 value is preferably in the range of from 0.1 to 15 micrometer, more preferably in the range of from 2.5 to 8 micrometer, determined as described in Reference Example 4 herein.

61. The process of any one of embodiments 41 to 60, wherein the pores of the porous internal walls of the porous wall-flow substrate employed according to (ii) have an average pore size of less than 30 micrometer, preferably in the range of from 6 to 28 micrometer, more preferably in the range of from 8 to 25 micrometer, more preferably in the range of from 10 to 23 micrometer, as determined according to Reference Example 3 herein.

62. The process of any one of embodiments 41 to 61, wherein according to (ii), the porous wall-flow substrate comprises, preferably consists of a cordierite, a silicon carbide, or an aluminum titanate.

63. The process of any one of embodiments 41 to 50, wherein according to (ii), coating the washcoat of the washcoat slurry provided in (i) onto pores of the porous wall flow filter substrate comprises immersing the porous wall flow filter substrate into the washcoat slurry, exposing the porous wall flow filter substrate to the washcoat slurry for a period of time, and removing the porous wall flow filter substrate from the washcoat slurry.

64. The process of embodiment 63, wherein according to (ii), the porous wall flow filter substrate removed from the washcoat slurry is subjected to calcination in a gas atmosphere, preferably at a temperature of the gas atmosphere in the range of from 300 to 590° C., more preferably in the range of from 300 to 450° C., the gas atmosphere preferably comprising oxygen.

65. The process of any one of embodiments 41 to 64, wherein (iii) comprises
   (iii.1) preparing a suspension comprising admixing a porous oxidic compound with an adjuvant;
   (iii.2) milling the suspension obtained from (iii.1).

66. The process of embodiment 65, wherein according to (iii.1), the adjuvant is one or more of water, a polyacrylate, a methylcellulose, and an alcohol, preferably octanol, wherein more preferably, the adjuvant is one or more of water and an alcohol, preferably octanol.

67. The process of embodiment 65 or 66, wherein according to (iii.1), prior to milling according to (iii.2), the pH of the obtained mixture is adjusted to a value in the range of from 2 to 7, preferably in the range of from 2.5 to 6, more preferably in the range of from 3 to 5, as determined by immersing a pH sensitive glass electrode into the obtained suspension.

68. The process of embodiment 67, wherein adjusting the pH of the obtained suspension comprises adding an inorganic and/or an organic acid, preferably an organic acid, more preferably acetic acid.

69. The process of any one of embodiments 65 to 68, wherein according to (iii.1), a suspension is prepared comprising admixing the porous oxidic compound with an adjuvant and with a source for a promotor.

70. The process of embodiment 69, wherein the source for a promotor is a source for one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

71. The process of embodiment 70, wherein the source for a promotor comprises a salt, preferably a nitrate, of the respective promotor element, more preferably zirconium nitrate and barium nitrate.

72. The process of any one of embodiments 69 to 71, comprising admixing the suspension obtained according to the process of embodiment 67 or 68 with the source for a promotor.

73. The process of any one of embodiments 65 to 72, wherein the porous oxidic compound comprised in the on-wall coating comprises one or more of an oxygen storage compound and a refractory metal oxide.

74. The process of embodiment 73, wherein the oxygen storage compound comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium and praseodymium, wherein more preferably, the oxygen storage compound comprises one or more of a cerium oxide, a mixture of a cerium oxide and a zirconium oxide, and a mixed oxide of cerium and zirconium, wherein more preferably, the oxygen storage compound comprises a mixed oxide of cerium and zirconium.

75. The process of embodiment 74, wherein the oxygen storage compound has a porosity in the range of from 0.1 to 1.2 ml/g preferably in the range of from 0.2 to 0.8 ml/g, more preferably in the range of from 0.3 to 0.6 ml/g, as determined according to Reference Example 1 herein.

76. The process of embodiment 74 or 75, wherein the oxygen storage compound has a BET specific surface area in the range of from 15 to 150 $m^2/g$, preferably in the range of from 30 to 100 $m^2/g$, more preferably in the range of from 50 to 80 $m^2/g$, as determined according to Reference Example 2 herein.

77. The process of any one of embodiment 73 to 76, wherein the refractory metal oxide comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide comprises an aluminum oxide.

78. The process of embodiment 77, wherein the aluminum oxide has a porosity in the range of from 0.2 to 1.5 ml/g preferably in the range of from 0.5 to 1.2 ml/g, more preferably in the range of from 0.7 to 1 ml/g, as determined according to Reference Example 1 herein.

79. The process of embodiment 77 or 78, wherein the aluminum oxide has a BET specific surface area in the range of from 30 to 250 $m^2/g$, preferably in the range of from 50 to 200 $m^2/g$, more preferably in the range of from 90 to 160 $m^2/g$, as determined according to Reference Example 2 herein.

80. The process of any one of embodiments 77 to 79, wherein from 90 to 100 weight-%, preferably from 95 to 100 weight-%, more preferably from 99 to 100 weight-% of the aluminum oxide comprised in the on-wall coating consist of gamma-aluminum oxide.

81. The process of any one of embodiments 65 to 80, wherein according to (iii.2), the mixture is milled so that the particle size distribution of the particles of the mixture is characterized by a Dv90 value which is greater than the average pore size of the coated pores of the porous wall flow filter substrate obtained from (ii), wherein the Dv90 value is preferably in the range of from 14 to 50 micrometer, more preferably in the range of from 18 to 44 micrometer, determined as described in Reference Example 4 herein.

82. The process of any one of embodiments 41 to 81, wherein according to (iv), coating the washcoat provided in (iii) onto the coated porous wall flow filter substrate obtained from (ii) comprises immersing the coated porous wall flow filter substrate obtained from (ii) into the washcoat slurry provided in (iii), exposing the coated porous wall flow filter substrate to the washcoat slurry for a period of time, and removing the coated porous wall flow filter substrate from the washcoat slurry.

83. The process of embodiment 82, wherein according to (iv), the coated porous wall flow filter substrate removed from the washcoat slurry is subjected to calcination in a gas atmosphere, preferably at a temperature of the gas atmosphere in the range of from 300 to 590° C., more preferably in the range of from 300 to 450° C., the gas atmosphere preferably comprising oxygen.

84. The process of any one of embodiments 41 to 83, consisting of steps (i) to (iv).

85. The process of embodiment 84 insofar as being dependent on embodiment 42, wherein (i) consists of steps (i.1) to (i.5).

86. The process of embodiment 84 or 85 insofar as being dependent on embodiment 65, wherein (iii) consists of steps (iii.1) and (iii.2).

87. A four-way conversion catalyst for the treatment of an exhaust gas stream of a gasoline engine, obtainable or obtained or preparable or prepared by a process according to any one of embodiments 41 to 86.

88. A four-way conversion catalyst for the treatment of an exhaust gas stream of a gasoline engine according to any one of embodiments 1 to 40, obtainable or obtained or preparable or prepared by a process according to any one of embodiments 41 to 86.

89. An exhaust gas treatment system downstream of a gasoline engine and in fluid communication with said gasoline engine, the system comprising a four-way conversion catalyst according to any one of embodiments 1 to 40 or embodiment 87 or 88.

90. The exhaust gas treatment system of embodiment 89, wherein the gasoline engine is a gasoline direct injection engine.

91. The exhaust gas treatment system of embodiment 89 or 90, wherein the exhaust gas stream of the gasoline engine comprises hydrocarbon (HC), carbon monoxide (CO), nitrogen oxides (NOx), and particulates.

92. Use of a four-way conversion catalyst according to any one of embodiments 1 to 40 or embodiment 87 or 88 for the treatment of an exhaust gas stream from a gasoline engine.

93. The use of embodiment 92, wherein the gasoline engine is a gasoline direct injection engine.

94. The use of embodiment 92 or 93, wherein the exhaust gas stream of the gasoline engine comprises hydrocarbon (HC), carbon monoxide (CO), nitrogen oxides (NOx), and particulates.

95. A method of treating an exhaust gas stream from a gasoline engine, comprising passing said exhaust gas stream through a four-way conversion catalyst according to any one of embodiments 1 to 40 or embodiment 87 or 88.

96. The method of embodiment 96, wherein the gasoline engine is a gasoline direct injection engine.

97. The method of embodiment 95 or 96, wherein the exhaust gas stream of the gasoline engine comprises hydrocarbon (HC), carbon monoxide (CO), nitrogen oxides (NOx), and particulates.

The present invention is further illustrated by the following reference examples, examples, and comparative examples.

EXAMPLES

Reference Example 1: Measurement of the Porosity of the Porous Oxidic Compound

The porosity of the porous oxidic compound, e.g. aluminum oxide or cerium-zirconium mixed oxide, was determined by physisorption of $N_2$ and analyzing the physisorption isotherms via BJH (Barett, Joyner, Halenda) analysis according to DIN 66134.

Reference Example 2: Measurement of the BET Specific Surface Area of Alumina The BET specific surface area of the alumina was determined according to DIN 66131 or DIN-ISO 9277 using liquid nitrogen.

Reference Example 3: Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 4: Measurement of the Dv90 Value

The particle size distribution, in particular the Dv90 value, was determined by a static light scattering method using Sympatec HELOS (3200) & QUIXEL equipment, wherein the optical concentration of the sample was in the range of from 6 to 10%.

Reference Example 5: General Coating Method

In order to coat a porous wall-flow substrate with a three-way conversion coating according to the present invention, the wall-flow substrate was immersed vertically in a portion of the washcoat for a specific length of the substrate which was equal to the targeted length of the coating to be applied. In this manner, the washcoat contacts the porous walls of the substrate and penetrates the wall completely for the length of immersion. The sample was left in the washcoat for a specific period of time, usually for 1-6 seconds. The substrate was then removed from the washcoat, and excess slurry was removed from the substrate by allowing it to drain from the substrate, then by blowing with compressed air (against the direction of washcoat penetration). Thereafter, it was calcined in air at 450° C. for at least 2 h.

Comparative Example 1: FWC Catalyst with In-Wall Coating Only

A porous wall-flow substrate having a three-way conversion (TWC) catalyst permeating the substrate wall was prepared at a washcoat loading of 1 g/in³ (60 g/L) on a cordierite substrate sized 4.66*5 inches with 300 CPSI (cells per square inch), 8 mill wall thickness, average porosity of 65% and mean pore size of 17 micrometer according to the following method.
(1) 942 g of a high surface area gamma-alumina (BET specific surface area=144 m²/g; total pore volume=0.843 ml/g; mean pore radius=109 Angstrom) were impregnated with an aqueous solution of rhodium nitrate ($Rh(NO_3)_3$) (9 g $Rh_2O_3$ in 100 g water). The Rh-impregnated alumina was calcined in air atmosphere at a temperature of 590° C. for 3 h. The calcined material was added to a water-based solution containing 1754 g deionized water, 5 g octanol and the following promotor precursors: 85 g of barium nitrate ($Ba(NO_3)_2$) and 96 g of zirconium nitrate ($Zr(NO_3)_4$). The resulting mixture was milled using a continuous milling apparatus so that the Dv90 value of the particles was 5 micrometer.
(2) 2550 g of an oxygen storage compound (OSC), a mixed oxide comprising Ce (40 weight % calculated as $CeO_2$) and Zr (45 weight-% calculated as $ZrO_2$), and further comprising Nd, La, and Y (15 weight-% in total, each calculated as $X_2O_3$) and having a Dv90 value of 31 micrometer, were admixed with 61 g of an aqueous solution of palladium nitrate ($Pd(NO_3)_2$) (17 g PdO in 100 g water). The Pd-impregnated OSC was calcined in air atmosphere at a temperature of 590° C. for 3 h. The calcined material was added to a water-based solution comprising 4000 g deionized water, 5 g octanol, and the following promotor precursors: 198 g of barium nitrate ($Ba(NO_3)_2$) and 145 g of zirconium nitrate ($Zr(NO_3)_4$). The resulting mixture was milled using the apparatus described above so that the Dv90 value of the particles was 5 micrometer.
(3) The materials obtained from (1) and (2) were combined to form the final TWC washcoat slurry.
(4) The porous wall-flow substrate was coated with the washcoat obtained from (3) as described in Reference Example 5 hereinabove.

Example 1: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:
(1) A dispersion comprising 3852 g of a high surface area gamma-alumina (BET specific surface area=149 m²/g; total pore volume=0.535 ml/g) was prepared by mixing 6715 g deionized water, 176 g octanol, and 241 g acetic acid. To this mixture, the following promotor precursors were added: 350 g of barium acetate (59.93 weight-%) and 697 g of zirconium acetate (30.15 weight-%).
(2) The resulting mixture was milled using the apparatus described above so that the final Dv90 value of the particles was 20.7 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.1 g/in³. The mixture obtained from (2) was applied such that the on-wall coat was located (only) in the inlet passages of the final four-way conversion catalyst, extending from the inlet end over the entire substrate length.

Example 2: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:
(1) A dispersion comprising 3925 g of a high surface area gamma-alumina (BET specific surface area=149 m²/g; total pore volume=0.535 ml/g) was prepared by mixing 6914 g deionized water, 56 g n-octanol, and 200 g acetic acid. To this mixture, the following promotor precursors were added: 112 g of barium acetate (59.75 weight-%) and 222. g of zirconium nitrate (30.02 weight-%).
(2) The resulting mixture was milled using the apparatus described above so that the final Dv90 value of the particles was 22 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.3 g/in$^3$. The mixture obtained from (2) was applied such that the on-wall coat was located (only) in the inlet passages of the final four-way conversion catalyst, extending from the inlet end over the entire substrate length.

Example 3: FWC Catalyst with In-Wall Coating and Outlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:
(1) A dispersion comprising 3852 g of a high surface area gamma-alumina (BET specific surface area=149 m$^2$/g; total pore volume=0.535 ml/g) was prepared by mixing 6715 g deionized water, 176 g octanol, and 241 g acetic acid. To this mixture, the following promotor precursors were added: 350 g of barium acetate (59.93 weight-%) and 697 g of zirconium acetate (30.15 weight-%).
(2) The resulting mixture was milled using the apparatus described above so that the final Dv90 value of the particles was 22 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.1 g/in$^3$. The mixture obtained from (2) was applied such that the on-wall coat was located (only) in the outlet passages of the final four-way conversion catalyst, extending from the inlet end over the entire substrate length.

Example 4: Test of the FWC of Comparative Example 1 and Examples 1, 2 and 3 on a Cold Flow Bench The backpressure of the particulate filter obtained as described in Comparative Example 1, Example 1, Example 2 and Example 3 was measured on a SuperFlow Cold Flow bench (SuperFlow SF 1020 Superbench at ambient conditions).

The back pressure data recorded at a volume flow of 600 m$^3$/h are reported for all samples in Table 1 below:

TABLE 1

| Cold Flow Back Pressure Data | |
|---|---|
| | Back pressure/mbar |
| Comparative Example 1 | 53.0 |
| Example 1 | 57.3 |
| Example 2 | 59.1 |
| Example 3 | 55.8 |

All samples of Examples 1 to 3 show a low to moderate increase in back pressure relative to Comparative Example 1.

Example 5: Test of the FWC of Comparative Example 1 and Examples 1, 2 and 3 According to NEDC The FWC of Comparative Example 1, Example 1, 2, and 3 were measured under New European Drive Cycle (NEDC) in close-coupled (CC) position on a dynamic engine bench equipped with a 2.0 L direct-injection turbo engine. Emissions of total hydrocarbon (HC), carbon monoxide (CO), nitrogenous oxides (NOx) as well as particulate number according to the PMP protocol were measured for the close-coupled and under floor catalyst and reported in Table 2 below:

TABLE 2

| NEDC Emission Results | | | | |
|---|---|---|---|---|
| | Comparative Example 1 | Example 1 | Example 2 | Example 3 |
| HC (g/km) | 0.086 | 0.087 | 0.087 | 0.090 |
| CO (g/km) | 0.45 | 0.49 | 0.43 | 0.47 |
| NOx (g/km) | 0.029 | 0.031 | 0.030 | 0.032 |
| Particulate Number (#/km) | 1.26E+11 | 8.46E+10 | 7.83E+10 | 8.48E+10 |

Example 1, 2 and 3 show improved filtration efficiency by increasing the amount of the additional alumina applied compared to Comparative Example 1. Such improvement is combined with a moderate to low back-pressure increase as shown in Table 1 above.

Example 6: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:
(1) A dispersion comprising 3671 g of a high surface area gamma-alumina (BET specific surface area=149 m$^2$/g; total pore volume=0.535 ml/g) was prepared by mixing 6388 g deionized water, 168 g octanol, and 200 g acetic acid. To this mixture, the following promotor precursors were added: 335 g of barium acetate (59.75 weight-%) and 666 g of zirconium nitrate (30.02 weight-%).
(2) The resulting mixture was milled using the apparatus described above so that the final Dv90 value of the particles was 42 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.1 g/in$^3$. The mixture obtained from (2) was applied such that the on-wall coat was located (only) in the inlet passages of the final four-way conversion catalyst, extending from the inlet end over the entire substrate length.

Example 7: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:

(1) A dispersion comprising 3998 g of high surface area gamma-alumina (BET specific surface area=149 m²/g; total pore volume=0.535 ml/g) was prepared by mixing 6997 g deionized water, 34 g n-octanol, and 200 g acetic acid. To this mixture, the following promotor precursors were added: 67 g of barium acetate (59.75 weight-%) and 133 g of zirconium nitrate (30.02 weight-%).
(2) The resulting mixture was milled using the apparatus described above so that the final Dv90 value of the particles was 42 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.5 g/in³. The mixture obtained from (2) was applied such that the on-wall coat was located (only) in the inlet passages of the final four-way conversion catalyst, extending from the inlet end over the entire substrate length.

Example 8: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 1. Then, a second washcoat was applied on it. The second slurry was prepared as follows:

(1) A dispersion comprising 4035 g of a high surface area gamma-alumina (BET specific surface area=149 m²/g; total pore volume=0.535 ml/g) was prepared by mixing 7077 g deionized water, 17 g n-octanol, and 200 g acetic acid. To this mixture, the following promotor precursors were added: 33 g of barium acetate (59.93 weight-%) and 66 g of zirconium nitrate (30.15 weight-%).
(2) The resulting mixture was milled using the apparatus described above so that the final Dv90 value of the particles was 42 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 2.0 g/in³. The mixture obtained from (2) was applied such that the on-wall coat was located (only) in the inlet passages of the final four-way conversion catalyst, extending from the inlet end over the entire substrate length.

Example 9: Test of the FWC of Comparative Example 1 and Examples 6, 7 and 8 on an Engine Bench The backpressure of the FWC obtained as described in Comparative Example 1, Example 6, Example 7 and Example 8 were measured on an engine bench (2.0 liter direct-injection turbo engine. The back pressure data were recorded at a mass flow of 320 kg/h and 900° C. are reported for all samples in Table 3 below:

TABLE 3

Back Pressure Data collected on Engine Bench

| | Back pressure/mbar |
|---|---|
| Comparative Example 1 | 166.9 |
| Example 6 | 167.9 |
| Example 7 | 177.1 |
| Example 8 | 220.3 |

Example 10: Test of the FWC of Comparative Example 1 and Examples 6, 7 and 8 According to NEDC The FWC of Comparative Example 1 and Examples 6, 7, and 8 were measured under New European Drive Cycle (NEDC) in close-coupled (CC) position on a dynamic engine bench equipped with a 2.0 L direct-injection turbo engine. Emissions of total hydrocarbon (HC), carbon monoxide (CO), nitrogenous oxides (NOx) as well as particulate number according to the PMP protocol were measured for the close-coupled and under floor catalyst and reported in Table 4 below:

TABLE 4

NEDC Emission Results

| | Comparative Example 1 | Example 6 | Example 7 | Example 8 |
|---|---|---|---|---|
| HC (g/km) | 0.090 | 0.082 | 0.090 | 0.090 |
| CO (g/km) | 0.349 | 0.33 | 0.365 | 0.355 |
| NOx (g/km) | 0.060 | 0.055 | 0.053 | 0.053 |
| Particulate Number (#/km) | 6.92E+10 | 6.41E+10 | 5.96E+10 | 4.61E+10 |

One can see that the Example 6, 7 and 8 show improved filtration efficiency than comparative example 1 combined with a low to moderate moderate back-pressure increase shown in Table 3 above.

Comparative Example 2: FWC Catalyst with In-Wall Coating Only

A porous wall-flow substrate having a three-way conversion (TWC) catalyst permeating the substrate wall was prepared at a washcoat loading of 1.16 g/in³ (70 g/L) on a cordierite substrate sized 5.2*4 inches with 300 CPSI (cells per square inch), 8 mill wall thickness, average porosity of 65% and mean pore size of 17 micrometer according to the following method.

(1) 1474 g of a high surface area gamma-alumina (BET specific surface area=144 m²/g; total pore volume=0.843 ml/g; mean pore radius=109 Angstrom) were impregnated with 112.3 g of an aqueous solution of rhodium nitrate ($Rh(NO_3)_3$) 8.78 weight-%) together with 1147 g deionized water. The Rh-impregnated alumina was calcined in air atmosphere at a temperature of 590° C. for 3 h. The calcined material was added to a water-based solution containing 2259 g deionized water, 8 g n-octanol, and the following promotor precursors: 132 g of barium nitrate ($Ba(NO_3)_2$) (58.7 weight-%) and 149 g of zirconium nitrate ($Zr(NO_3)_4$) (21.3 weight-%). The resulting mixture was milled using a continuous milling apparatus so that the Dv90 value of the particles was 5.45 micrometer.
(2) 3992 g of an oxygen storage compound (OSC), a mixed oxide comprising Ce (40 weight % calculated as $CeO_2$)

and Zr (45 weight-% calculated as ZrO$_2$), and further comprising Nd, La, and Y (15 weight-% in total, each calculated as X$_2$O$_3$) were admixed with 28.9 g of an aqueous solution of palladium nitrate (Pd(NO$_3$)$_2$) (19.47 weight-%) together with 1365 g deionized water. The Pd-impregnated OSC was calcined in air atmosphere at a temperature of 590° C. for 3 h. The calcined material was added to a water-based solution comprising 5255 g deionized water, 8 g octanol, 68 g nitric acid, and the following promotor precursors: 307 g of barium nitrate (Ba(NO$_3$)$_2$) (58.7 weight-%) and 223 g of zirconium nitrate (Zr(NO$_3$)$_4$) (21.3 weight-%). The resulting mixture was milled using the apparatus described above so that the Dv90 value of the particles was 5.75 micrometer.
(3) The materials obtained from (1) and (2) were combined to form the final TWC washcoat slurry.
(4) The porous wall-flow substrate was coated with the washcoat obtained from (3) as described in Reference Example 5 hereinabove.

Example 11: FWC Catalyst with In-Wall Coating and Inlet On-Wall Coating Comprising Alumina A porous wall-flow substrate having a three-way conversion (TWC) catalyst permeating the substrate wall was prepared as described in Comparative Example 2 but with a washcoat loading of 1.25 g/in$^3$. Then, a second washcoat was applied on it. The second slurry was prepared as follows:
(1) A dispersion comprising 3212 g of a high surface area gamma-alumina (BET specific surface area=149 m$^2$/g; total pore volume=0.535 ml/g) was prepared by mixing 5589 g deionized water, 147 g octanol, and 175 g acetic acid. To this mixture, the following promotor precursors were added: 293 g of barium acetate (59.65 weight-%) and 583 g of zirconium nitrate (30.02 weight-%).
(2) The resulting mixture was milled using the apparatus described above so that the final Dv90 value of the particles was 22 micrometer.
(3) The mixture obtained from (2) was then coated onto the coated wall-flow substrate according to the method as described in Reference Example 5 hereinabove to obtain an overall washcoat loading (loading of in-wall coating plus loading of on-wall coating) of 1.33 g/in$^3$. The mixture obtained from (2) was applied such that the on-wall coat was located (only) in the inlet passages of the final four-way conversion catalyst, extending from the inlet end over the entire substrate length.

Example 12: Test of the FWC of Comparative Example 2 and Example 11 According to RTS95

The particle filters of Comparative Example 2 and Example 11 were measured under Random Test Sequence 95 Aggressive RTS95 Test in underfloor (UF) location after the same flowthrough TWC catalysts in close-coupled (CC) position. The close-coupled catalyst was a state of the art TWC catalyst, described, e.g., in WO 2014/116897 A, with an overall precious metal loading of 60 g/ft$^3$ and Pt/Pd/Rh metal ratio of 0/56/4. The washcoat loading of the TWC catalyst in the close-coupled position was 3.8 g/in$^3$. The TWC catalyst has been aged at a temperature of 1030° C. for 150 hours on engine while the catalysts of Comparative Example 2 and Example 11 were fresh. Emissions of total hydrocarbon (HC), carbon monoxide (CO), nitrogenous oxides (NOx) as well as particulate number according to the PMP protocol were measured for the close-coupled and under floor catalyst and reported in Table 5 below. The backpressure of the FWC obtained as described in Comparative Example 2 and Example 11 were measured on cold flow bench SF-1020.

The back pressure data recorded at 700 m$^3$/h are reported for all samples in Table 5 below:

TABLE 5

RTS95 Emission Results and Backpressure Results

| | Comparative Example 2 | Example 11 |
|---|---|---|
| HC (g/km) | 0.046 | 0.045 |
| CO (g/km) | 0.405 | 0.341 |
| NOx (g/km) | 0.048 | 0.048 |
| Particulate Number (#/km) | 6.22E+11 | 5.39E+11 |
| Backpressure (mbar) | 45 | 50 |

It is possible to see that the Example 11 shows improved filtration efficiency compared with Comparative Example 2 combined with low to moderate back-pressure increase.

CITED PRIOR ART

Figure 1:
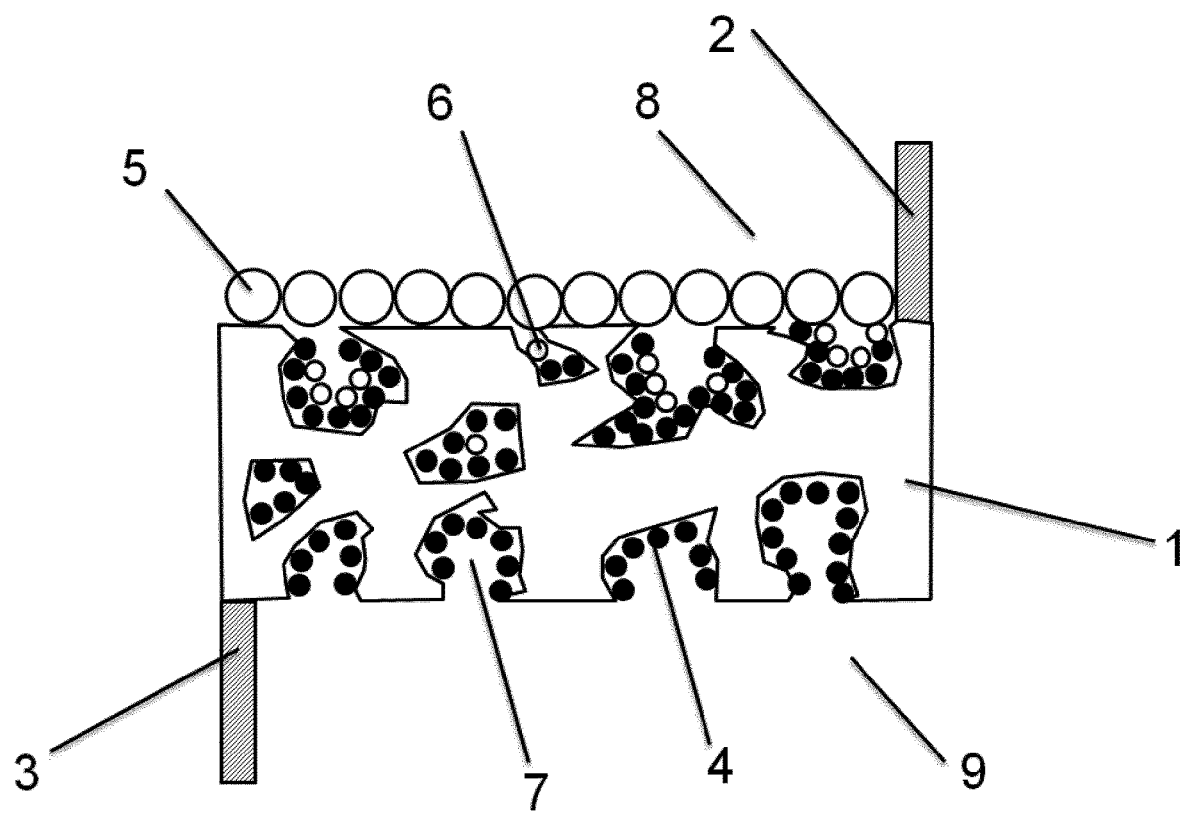
FIG. 1 shows a schematic section through the catalyst according to the present invention, in particular the in-wall coating and the inlet on-wall coating. The reference numbers used in FIG. 1 stand for:
1 porous wall of the wall flow filter substrate
2 closed outlet end of the inlet passage 8
3 closed inlet end of the outlet passage 9
4 particle of the in-wall coating
5 particle of the on-wall coating
6 particle of the on-wall which, due to its small size, is present in a pore of the porous wall
7 pore of the porous internal wall 1 of the wall flow filter substrate
8 inlet passage defined by the wall 1 of the porous wall flow filter substrate and another wall (not shown)
9 outlet passage defined by the wall 1 of the porous wall flow filter substrate and another wall (not shown)
Figure 2:
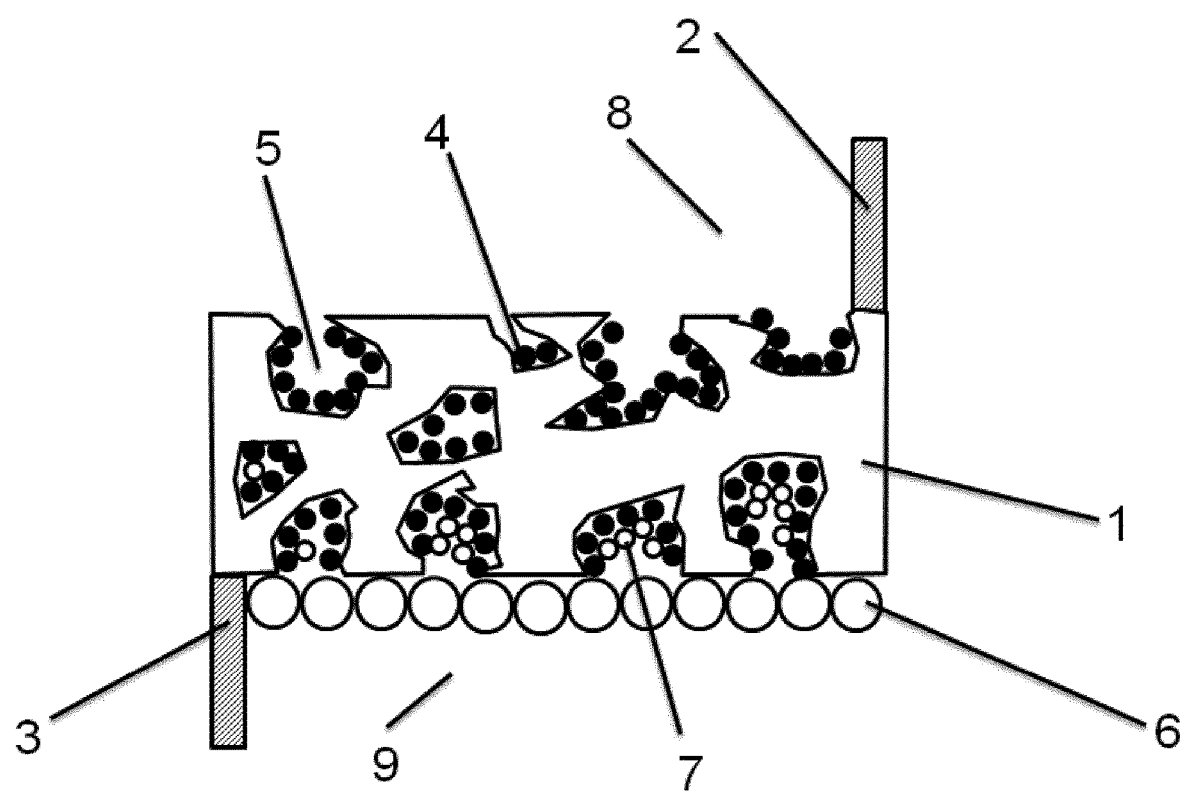
FIG. 2 shows a schematic section through the catalyst according to the present invention, in particular the in-wall coating and the outlet on-wall coating. The reference numbers used in FIG. 2 stand for:
1 porous wall of the wall flow filter substrate
2 closed outlet end of the inlet passage 8
3 closed inlet end of the outlet passage 9
4 particle of the in-wall coating
5 pore of the porous internal wall 1 of the wall flow filter substrate
6 particle of the on-wall coating
7 particle of the on-wall which, due to its small size, is present in a pore of the porous wall
8 inlet passage defined by the wall 1 of the porous wall flow filter substrate and another thereof (not shown)
9 outlet passage defined by the wall 1 of the porous wall flow filter substrate and another wall (not shown)
Figure 3:
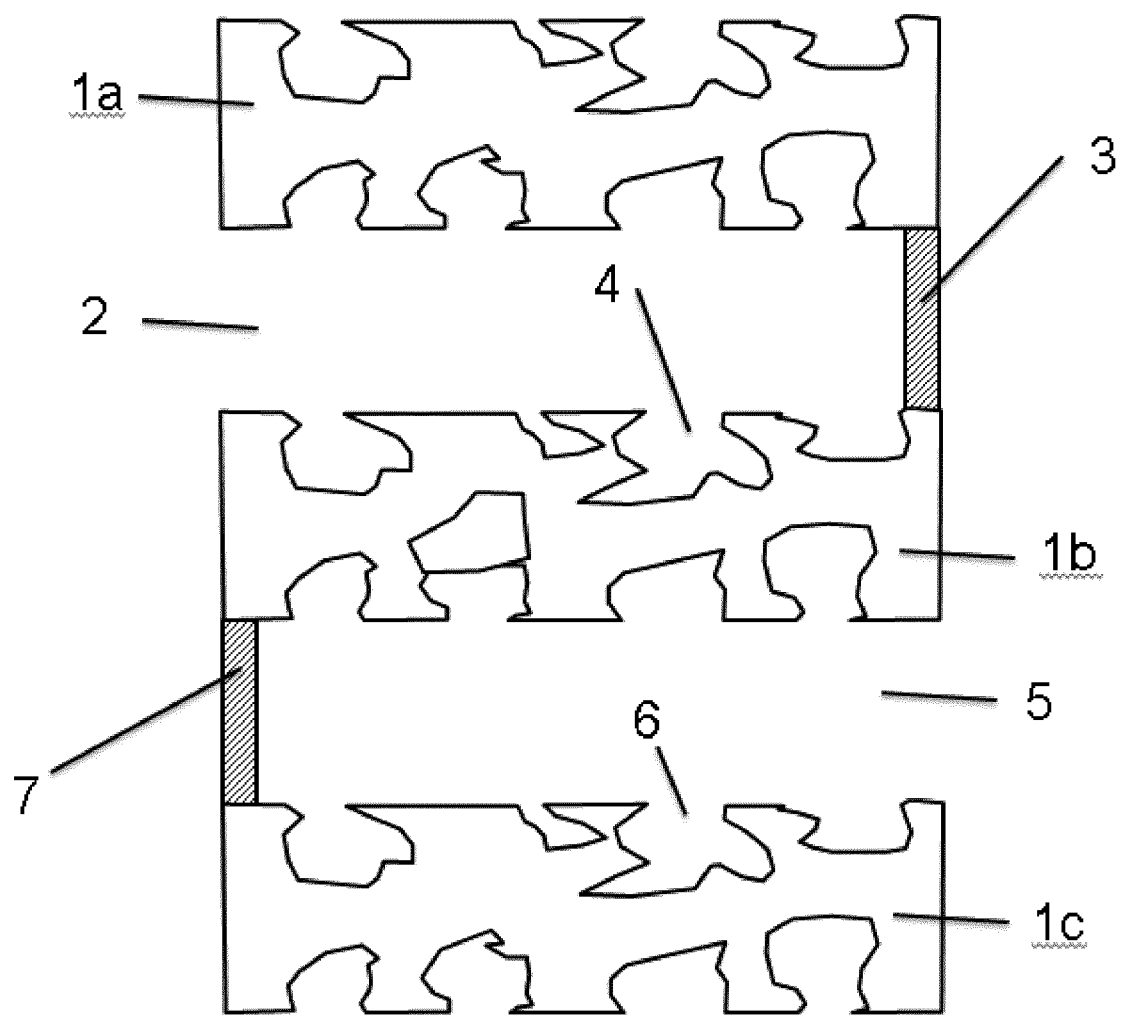
FIG. 3 shows a schematic section through a portion of a porous wall-flow substrate used according to the present invention prior to application of the in-wall coating and the on-wall coating. The reference numbers used in FIG. 3 stand for:
1a porous wall of the wall flow filter substrate
1b porous wall of the wall flow filter substrate
1c porous wall of the wall flow filter substrate 2 inlet passage defined by the porous internal walls 1a and 1b of the porous wall flow filter substrate
3 closed outlet end of the inlet passage 2
4 pore of the porous internal wall 1b of the wall flow filter substrate
5 outlet passage defined by the porous internal walls 1b and 1c of the porous wall flow filter substrate
6 pore of the porous internal wall 1c of the wall flow filter substrate
7 closed inlet end of the outlet passage 5

US 2012/124974 A1
WO 2014/116897 A

The invention claimed is:

1. A four-way conversion catalyst suitable for treating an exhaust gas stream of a gasoline engine, the catalyst comprising:
  a porous wall flow filter substrate comprising an inlet end, an outlet end, a substrate axial length extending between the inlet end and the outlet end, and a plurality of passages defined by porous internal walls of the porous wall flow filter substrate,
  wherein the plurality of passages comprise inlet passages having an open inlet end and a closed outlet end, and outlet passages having a closed inlet end and an open outlet end,
  wherein pores of the porous internal walls comprise a three-way conversion catalytic in-wall coating comprising an oxygen storage compound and a platinum group metal supported on a refractory metal oxide,
  wherein, on at least a portion of a surface of the porous internal walls, the surface defining an interface between the porous internal walls and the passages, the catalyst comprises a porous on-wall coating extending from the surface of the internal walls to the passage, and
  wherein the on-wall coating comprises a porous oxidic compound and has a platinum group metal content in a range of from 0 to 0.001 weight-%, based on total on-wall coating weight.

2. The catalyst of claim 1, wherein the porous oxidic compound comprised in the on-wall coating comprises an oxygen storage compound and/or a refractory metal oxide.

3. The catalyst of claim 2, wherein the oxygen storage compound in the on-wall coating comprises cerium, and/or
  wherein the oxygen storage compound in the on-wall coating has a porosity in a range of from 0.1 to 1.2 mL/g, and/or has a BET specific surface area in a range of from 15 to 150 m$^2$/g.

4. The catalyst of claim 2, wherein the refractory metal oxide in the on-wall coating comprises an oxide comprising aluminum.

5. The catalyst of claim 2, wherein the oxygen storage compound in the on-wall coating comprises cerium, and
  wherein the oxygen storage compound in the on-wall coating has a porosity in a range of from 0.1 to 1.2 mL/g, and has a BET specific surface area in a range of from 15 to 150 m$^2$/g.

6. The catalyst of claim 2, wherein the oxygen storage compound in the on-wall coating comprises cerium oxide.

7. The catalyst of claim 2, wherein the oxygen storage compound in the on-wall coating comprises a mixed oxide comprising cerium and zirconium and/or praseodymium.

8. The catalyst of claim 1, wherein the on-wall coating further comprises a promotor.

9. The catalyst of claim 1, wherein the on-wall coating further comprises a zeolitic compound.

10. The catalyst of claim 1, wherein the on-wall coating comprises an inlet on-wall coating comprising a porous oxidic compound, or an outlet on-wall coating comprising porous oxidic compound, or an inlet on-wall coating comprising a porous oxidic compound and an outlet on-wall coating comprising porous oxidic compound,
  wherein the internal walls defining the inlet passages comprise the inlet on-wall coating comprising a porous oxidic compound, wherein the inlet on-wall coating length is x % of the substrate axial length wherein 0≤x≤100;
  wherein the internal walls defining the outlet passages comprise the outlet on-wall coating comprising a porous oxidic compound, wherein the outlet on-wall coating length is y % of the substrate axial length wherein 0≤y≤100;
  wherein x+y>0.

11. The catalyst of claim 10, wherein 0<x≤100, or wherein 0<y≤100.

12. The catalyst of claim 1, comprising the on-wall coating at a loading in a range of from 0.01 to 1.5 g/in$^3$.

13. The catalyst of claim 1, comprising the three-way conversion catalytic in-wall coating at a loading in a range of from 0.1 to 5 g/in$^3$.

14. The catalyst of claim 1, wherein the three-way conversion catalytic in-wall coating comprises a hydrocarbon oxidation component, a carbon monoxide oxidation component, and a nitrogen oxide reduction component.

15. The catalyst of claim 1, wherein the platinum group metal of the three-way conversion catalytic in-wall coating comprises ruthenium, palladium, rhodium, platinum, and/or iridium,
  wherein the oxygen storage compound of the three-way conversion catalytic in-wall coating comprises cerium,
  wherein the refractory metal oxide support of the three-way conversion catalytic in-wall coating comprises aluminum,
  wherein the three-way conversion catalytic in-wall coating comprises a promotor comprising zirconium.

16. A process for preparing the catalyst of claim 1, comprising
  (i) providing a washcoat slurry comprising a source for a three-way conversion catalytic in-wall coating, optionally comprising
    (i.1) impregnating a source of a platinum group metal onto a refractory metal oxide support;
    (i.2) admixing the platinum group metal supported on the refractory metal oxide with one or more of an adjuvant and a source for a promotor, preferably with an adjuvant and a source for a promotor; and preferably milling the obtained mixture;
    (i.3) impregnating a source of a platinum group metal onto an oxygen storage compound;
    (i.4) admixing the platinum group metal supported on the oxygen storage compound with one or more of an adjuvant and a source for a promotor, preferably with an adjuvant and a source for a promotor; and preferably milling the obtained mixture;
    (i.5) admixing the mixture obtained from (i.2) and the mixture obtained from (i.4), obtaining the washcoat slurry comprising a source for the three-way conversion catalytic in-wall coating;
  (ii) coating the washcoat of the washcoat slurry from the providing (i) onto the porous wall flow filter substrate, to obtain the wall flow filter substrate wherein the pores of the porous internal walls comprise a three-way conversion catalytic in-wall coating comprising the oxygen storage compound and the platinum group metal supported on the refractory metal oxide;

(iii) providing a washcoat slurry comprising a source for the on-wall coating comprising a porous oxidic compound, optionally comprising (iii.1) preparing a suspension comprising admixing a porous oxidic compound with an adjuvant;

(iii 2) milling the suspension obtained from the preparing (iii 1); and (iv) coating the washcoat of the washcoat slurry from the providing (iii) onto the coated porous wall flow filter substrate obtained in the coating (ii).

17. An exhaust gas treatment system downstream of a gasoline engine and in fluid communication with the gasoline engine, the system comprising:

the catalyst of claim 1.

18. The system of claim 17, wherein the gasoline engine is a gasoline direct injection engine.

* * * * *